United States Patent
Nishiguchi

(10) Patent No.: US 10,807,608 B2
(45) Date of Patent: Oct. 20, 2020

(54) VEHICLE CONTROL SYSTEM, VEHICLE CONTROL METHOD, AND STORAGE MEDIUM

(71) Applicant: HONDA MOTOR CO., LTD., Minato-ku, Tokyo (JP)

(72) Inventor: Haruhiko Nishiguchi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 154 days.

(21) Appl. No.: 16/114,271

(22) Filed: Aug. 28, 2018

(65) Prior Publication Data

US 2019/0071099 A1 Mar. 7, 2019

(30) Foreign Application Priority Data

Sep. 5, 2017 (JP) .................................. 2017-170389

(51) Int. Cl.
- *B60W 30/12* (2020.01)
- *B60W 50/12* (2012.01)
- *B62D 15/02* (2006.01)

(52) U.S. Cl.
CPC ............ *B60W 50/12* (2013.01); *B60W 30/12* (2013.01); *B62D 15/0255* (2013.01);
(Continued)

(58) Field of Classification Search
CPC .......... B60W 30/18163; B60W 10/04; B60W 10/20; B60W 30/095; B60W 50/12;
(Continued)

(56) References Cited

U.S. PATENT DOCUMENTS 9,884,625 B2 * 2/2018 Taira ...................... B60W 10/04
9,884,645 B2 * 2/2018 Fujii ............... B60W 30/18163
(Continued)

FOREIGN PATENT DOCUMENTS

JP 2012-226392 11/2012
JP 2015-168406 9/2015
(Continued)

OTHER PUBLICATIONS

Reddy et al., On board assistant to GPS navigation of vehicles, 2009, IEEE, p. 7-13 (Year: 2009).*
(Continued)

*Primary Examiner* — McDieunel Marc
(74) *Attorney, Agent, or Firm* — Amin, Turocy & Watson, LLP

(57) ABSTRACT

A vehicle control system includes: a lane change support control unit (150) configured to execute lane change of a vehicle independently of a steering operation by an occupant of the vehicle by receiving an operation from the occupant of the vehicle; a road information acquiring unit (151) configured to acquire a type of a road on which the vehicle is traveling; a lane changeability determining unit (152, 153) configured to determine whether lane change of the vehicle is to be executed by the lane change support control unit; and a lane keeping support control unit (140) configured to control a steering device such that the vehicle is prevented from departing from a lane on which the vehicle is traveling independently of the steering operation by the occupant of the vehicle and to continue to perform a lane keeping operation in a case that the lane changeability determining unit determines that lane change of the vehicle is not to be executed on the basis of the type of the road.

9 Claims, 12 Drawing Sheets

(52) U.S. Cl.
CPC ..... *B60W 2540/18* (2013.01); *B60W 2552/05* (2020.02); *B60W 2710/20* (2013.01)

(58) Field of Classification Search
CPC ............. B60W 30/12; B60W 2710/20; B60W 2552/05; B60W 2540/18; G05D 1/0212; G08G 1/163; B62D 15/0255
See application file for complete search history.

(56) References Cited

U.S. PATENT DOCUMENTS

| | | | |
|---|---|---|---|
| 10,464,604 B2* | 11/2019 | Hashimoto | G05D 1/0212 |
| 2016/0304097 A1* | 10/2016 | Taira | B60W 10/20 |
| 2017/0061799 A1* | 3/2017 | Fujii | G08G 1/167 |
| 2017/0151982 A1* | 6/2017 | Fujii | B60W 10/20 |
| 2017/0233004 A1* | 8/2017 | Hatano | B62D 15/0265 701/41 |
| 2017/0240186 A1* | 8/2017 | Hatano | B60W 30/095 |
| 2018/0043935 A1* | 2/2018 | Hashimoto | G08G 1/163 |

FOREIGN PATENT DOCUMENTS

| | | |
|---|---|---|
| JP | 2016-224785 | 12/2016 |
| JP | 2017-65420 | 4/2017 |
| JP | 2017-146817 | 8/2017 |

OTHER PUBLICATIONS

He et al., Monocular based lane-change on scaled-down autonomous vehicles, 2011, IEEE, p. 144-149 (Year: 2011).*

Amditis et al., A Situation-Adaptive Lane-Keeping Support System: Overview of the SAFELANE Approach, 2010, IEEE, p. 617-629 (Year: 2010).*

Zhenhai et al., Optimal preview trajectory decision model of lane-keeping system with driver behavior simulation and Artificial Potential Field, 2009, IEEE, p. 797-801 (Year: 2009).*

Feng et al., Study on Intelligent Vehicle Lane Change Path Planning and Control Simulation, 2006, IEEE, p. 683-688 (Year: 2006).*

Xiaochuan et al., Receding horizon control for lane tracking of intelligent vehicles, 2016, IEEE, p. 9032-9037 (Year: 2016).*

Nilsson et al., Automated highway lane changes of long vehicle combinations: A specific comparison between driver model based control and non-linear model predictive control, 2015, IEEE, p. 1-8 (Year: 2015).*

Liu et al., Predictive control of a vehicle convoy considering lane change behavior of the preceding vehicle, 2015, IEEE, p. 4374-4379 (Year: 2015).*

Japanese Office Action for Japanese Patent Application No. 2017-170389 dated May 14, 2019.

Japanese Office Action for Japanese Patent Application No. 2017-170389 dated Oct. 15, 2019.

* cited by examiner

VEHICLE CONTROL SYSTEM, VEHICLE CONTROL METHOD, AND STORAGE MEDIUM

CROSS-REFERENCE TO RELATED APPLICATION

Priority is claimed on Japanese Patent Application No. 2017-170389, filed Sep. 5, 2017, the content of which is incorporated herein by reference.

BACKGROUND OF THE INVENTION

Field of the Invention

The invention relates to a vehicle control system, a vehicle control method, and a storage medium.

Description of Related Art

In the related art, a technique of executing lane change support control by determining whether a vehicle serving as an obstacle in lane change is present in a target lane when an operation of a direction indicator switch is detected during driving support for lane keeping, prohibiting lane change when a vehicle serving as an obstacle is present, and releasing the prohibition of lane change after waiting until the vehicle serving as an obstacle disappears is known (for example, see Japanese Unexamined Patent Application, First Publication No. 2012-226392).

SUMMARY OF THE INVENTION

However, when a vehicle is traveling on an expressway but a system erroneously recognizes that the vehicle is traveling on a general road due to erroneous map matching or the like, there is a likelihood that an occupant may not understand erroneous recognition of the system and may misunderstand that automatic lane change is being executed. Accordingly, even when the occupant performs an operation for executing lane change of the vehicle, automatic lane change may not be executed, driving support may end unlike the intention of the occupant, and unexpected disturbance may occur in vehicle behavior.

An aspect of the invention is made in consideration of the above-mentioned circumstances and an objective thereof is to provide a vehicle control system, a vehicle control method, and a storage medium that can prevent unexpected disturbance from occurring in vehicle behavior.

A vehicle control system, a vehicle control method, and a storage medium according to the invention employ the following configurations.

(1) A vehicle control system according to an aspect of the invention is a vehicle control system including: a lane change support control unit configured to execute lane change of a vehicle independently of a steering operation by an occupant of the vehicle by receiving an operation from the occupant of the vehicle; a road information acquiring unit configured to acquire at least a type of a road on which the vehicle is traveling; a lane changeability determining unit configured to determine whether lane change of the vehicle is to be executed by the lane change support control unit; and a lane keeping support control unit configured to control a steering device such that the vehicle is prevented from departing from a lane on which the vehicle is traveling without depending on the steering operation by the occupant of the vehicle and to continue to perform a lane keeping operation in a case that the lane changeability determining unit determines that lane change of the vehicle is not to be executed on the basis of the type of the road.

(2) A vehicle control system according to an aspect of the invention is a vehicle control system including: a lane change support control unit configured to execute lane change of a vehicle independently of a steering operation by an occupant of the vehicle by receiving an operation from the occupant of the vehicle; a lane changeability determining unit configured to determine whether lane change of the vehicle is to be executed by the lane change support control unit; a driving operator configured to receive a steering operation of the vehicle from the occupant; a grip determining unit configured to determine whether the occupant is gripping the driving operator; and a lane keeping support control unit configured to control a steering device such that the vehicle is prevented from departing from a lane on which the vehicle is traveling independently of a steering operation by the occupant of the vehicle and to continue to perform a lane keeping operation in a case that the lane changeability determining unit determines that lane change of the vehicle is not to be executed and the grip determining unit determines that the occupant is not gripping the driving operator.

(3) In the aspect of (2), the lane keeping support control unit may end the lane keeping operation thereof in a case that the grip determining unit determines that the occupant is gripping the driving operator.

(4) In the aspect of (1), the lane change support control unit may execute lane change using the lane change support control unit in a case that a state of the vehicle satisfies a first condition for switching lane change support control for the vehicle to a starting state and a second condition for switching the lane change support control to an operating state, and may execute lane keeping using the lane keeping support control unit until a predetermined time elapses in a case that the state of the vehicle satisfies the first condition.

(5) In the aspect of (1), the vehicle control system may further include an information output unit configured to notify the occupant of one or both of a fact that lane change of the vehicle is not to be executed by the lane change support control unit and a fact that the lane keeping support control unit will continue to perform the lane keeping operation in a case that the lane changeability determining unit determines that lane change of the vehicle is not to be executed.

(6) In the aspect of (1), the lane changeability determining unit may determine that lane change of the vehicle is not to be executed in a case that the type of the road on which the vehicle is traveling is not an expressway.

(7) In the aspect of (1), the vehicle control system may further include a direction indicator that receives an instruction for lane change from the occupant, and the lane keeping support control unit may continue to perform the lane keeping operation in a case that lane change is being instructed by the direction indicator.

(8) A vehicle control method according to an aspect of the invention is a vehicle control method which is performed by a computer mounted in a vehicle, the vehicle control method including: executing lane change of the vehicle independently of a steering operation by an occupant of the vehicle by receiving an operation from the occupant of the vehicle; acquiring at least a type of a road on which the vehicle is traveling; determining whether lane change of the vehicle is to be executed; and controlling a steering device such that the vehicle is prevented from departing from a lane on which the vehicle is traveling independently of a steering operation by the occupant of the vehicle and continuing to perform a lane keeping operation in a case that it is determined that lane change of the vehicle is not to be executed on the basis of the acquired type of the road.

(9) A storage medium according to an aspect of the invention is a non-transitory computer-readable storage medium having a program stored therein, the program causing an onboard computer to perform: executing lane change of the vehicle independently of a steering operation by an occupant of the vehicle by receiving an operation from the occupant of the vehicle; acquiring at least a type of a road on which the vehicle is traveling; determining whether lane change of the vehicle is to be executed; and controlling a steering device such that the vehicle is prevented from departing from a lane on which the vehicle is traveling independently of a steering operation by the occupant of the vehicle and continuing to perform a lane keeping operation in a case that it is determined that lane change of the vehicle is not to be executed on the basis of the acquired type of the road.

According to the aspects of (1) to (9), it is possible to prevent unexpected disturbance from occurring in vehicle behavior.

DETAILED DESCRIPTION OF THE INVENTION

Hereinafter, a vehicle control system, a vehicle control method, and a storage medium according to an embodiment of the invention will be described with reference to the accompanying drawings.

First Embodiment

[Entire Configuration]

Figure 1:
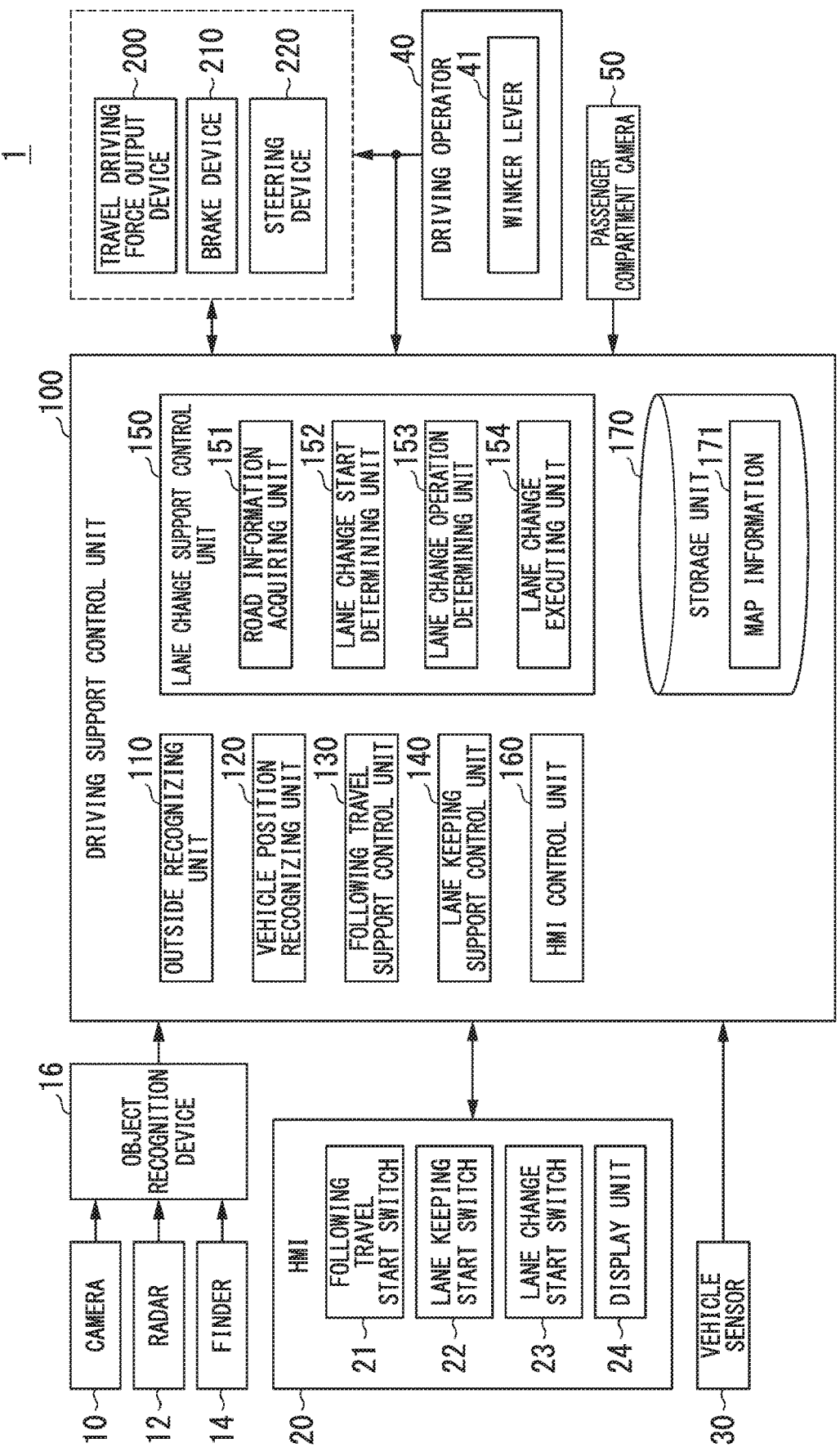
FIG. 1 is a diagram showing a configuration of a vehicle control system according to a first embodiment.

FIG. 1 is a diagram showing a configuration of a vehicle control system 1 according to a first embodiment. A vehicle in which the vehicle control system 1 is mounted (hereinafter referred to as a host vehicle M) is, for example, a vehicle with two wheels, three wheels, or four wheels and a drive source thereof is an internal combustion engine such as a diesel engine or a gasoline engine, an electric motor, or a combination thereof. An electric motor operates using electric power which is generated by a power generator connected to an internal combustion engine or electric power which is discharged from a secondary battery or a fuel cell.

The vehicle control system 1 includes, for example, a camera 10, a radar 12, a finder 14, an object recognition device 16, a human-machine interface (HMI) 20, vehicle sensors 30, driving operators 40, a passenger compartment camera 50, a driving support control unit 100, a travel driving force output device 200, a brake device 210, and a steering device 220. These devices or units are connected to each other via a multiplex communication line such as a controller area network (CAN) communication line, a serial communication line, a radio communication network, or the like. The configuration illustrated in FIG. 1 is only an example and a part of the configuration may be omitted or other configuration components may be added thereto.

The camera 10 is, for example, a digital camera using a solid-state imaging device such as a charge coupled device (CCD) or a complementary metal oxide semiconductor (CMOS). One or more cameras 10 are attached to arbitrary positions on the host vehicle M. In a case that the front view is imaged, the camera 10 is attached to an upper part of a front windshield, a rear surface of a rearview mirror, or the like. The camera 10 images the surroundings of the host vehicle M, for example, periodically and repeatedly. The camera 10 may be a stereoscopic camera.

The radar 12 radiates radio waves such as millimeter waves to the surroundings of the host vehicle M, detects radio waves (reflected waves) reflected by an object, and detects at least a position of (a distance and a direction to) the object. One or more radars 12 are attached to arbitrary positions on the host vehicle M. The radar 12 may detect a position and a speed of an object using a frequency modulated continuous wave (FM-CW) method.

The finder 14 is a light detection and ranging or laser imaging detection and ranging (LIDAR) device that measures scattered light in response to applied light and detects a distance to an object. One or more finders 14 are attached to arbitrary positions on the host vehicle M.

The object recognition device 16 performs sensor fusion processing on the detection results from some or all of the camera 10, the radar 12, and the finder 14 and recognizes a position, a type, a speed, a moving direction, and the like of an object. The recognized object is a type of object such as a vehicle, a guard rail, a utility pole, a pedestrian, and a road sign. The object recognition device 16 outputs the recognition results to the driving support control unit 100. The object recognition device 16 may output a part of information input from the camera 10, the radar 12, or the finder 14 to the driving support control unit 100 without any change therein.

The HMI 20 presents a variety of information to an occupant of the host vehicle M and receives an input operation from the occupant. The HMI 20 includes, for example, various buttons such as a following travel start switch 21, a lane keeping start switch 22, and a lane change start switch 23, a display unit 24, a speaker, a microphone, and a buzzer. The units of the HMI 20 are attached to, for example, parts of an instrument panel or a steering wheel. The units of the HMI 20 may be attached to arbitrary positions on a passenger seat or rear seat.

The following travel start switch 21, the lane keeping start switch 22, and the lane change start switch 23 are switches for switching between a driving support mode and a manual driving mode. The driving support mode is, for example, a mode in which the travel driving force output device 200 and one or both of the brake device 210 and the steering device 220 are controlled by the driving support control unit 100. The manual driving mode is a mode in which the travel driving force output device 200, the brake device 210, and the steering device 220 are controlled on the basis of an amount of operation of the driving operators 40.

The following travel start switch 21 is a switch for executing following travel support control of causing the host vehicle M to follow a preceding vehicle using a following travel support control unit 130 independently of a steering operation or an acceleration/deceleration operation by the occupant. The steering operation is, for example, an operation on a steering operator such as a steering wheel included in the driving operators 40. The acceleration/deceleration operation is, for example, an operation on an acceleration/deceleration operator such as an accelerator pedal and a brake pedal included in the driving operators 40. For example, a joystick or a gesture recognizer can also be used as the steering operator and the acceleration/deceleration operator. The preceding vehicle is, for example, a neighboring vehicle which is within a predetermined distance (for example, about 50 [m]) in front of the host vehicle M among neighboring vehicles recognized by an outside recognizing unit 110.

The lane keeping start switch 22 is a switch for starting lane keeping support control of keeping a traveling lane of the host vehicle M using a lane keeping support control unit 140 independently of a steering operation by the occupant. Keeping of a traveling lane means that steering control is executed such that a traveling position in a lane width direction of a lane in which the host vehicle travels (hereinafter referred to as a current lane) is kept with respect to the center of the current lane.

The lane change start switch 23 is a switch for starting lane change support control of changing the lane of the host vehicle M using a lane change support control unit 150 independently of the steering operation and the acceleration/deceleration operation by the occupant. The lane change support control is to automatically perform lane change of the host vehicle M to a target neighboring lane by controlling one or both of steering control and speed control of the host vehicle M. In the following description, the lane change support control by the lane change support control unit 150 is referred to as "automatic lane change support control." The lane change start switch 23 may employ a one-touch winker switch and may receive information indicating one direction from right and left to which the host vehicle M changes its lane in addition to (or instead of) receiving a lane change starting operation.

The display unit 24 can employ various types of display device such as a liquid crystal display (LCD) or an organic electroluminescence (EL) display. The display unit 24 may be a touch panel that receives an input based on an operation on a screen thereof.

The vehicle sensors 30 include, for example, a vehicle speed sensor that detects a speed of the host vehicle M, an acceleration sensor that detects an acceleration, a yaw rate sensor that detects an angular velocity around a vertical axis, and a direction sensor that detects a direction of the host vehicle M. The speed includes, for example, at least one of a longitudinal speed in a traveling direction of the host vehicle M and a lateral speed in a lateral direction of the host vehicle M. The acceleration includes, for example, at least one of a longitudinal acceleration in the traveling direction of the host vehicle M and a lateral acceleration in the lateral direction of the host vehicle M. The sensors included in the vehicle sensors 30 output detection signals indicating the detection results to the driving support control unit 100.

The driving operator 40 includes, for example, the steering wheel, a winker lever 41 that activates a winker (an example of a "direction indicator"), an accelerator pedal, a brake pedal, a shift lever, and other operators. For example, an operation detector that detects an amount of operation of the corresponding operator by an occupant is attached to each operator of the driving operators 40. The operation detectors detect a position of the winker lever 41, an amount of depression of the accelerator pedal or the brake pedal, a position of the shift lever, a steering angle or a steering torque of the steering wheel, and the like. The operation detectors output detection signals indicating the detection results thereof to the driving support control unit 100, the travel driving force output device 200, and one or both of the brake device 210 and the steering device 220.

The passenger compartment camera 50 images, for example, an upper half of an occupant sitting on a seat installed in the passenger compartment (particularly, an occupant sitting on a driver seat). The passenger compartment camera 50 is, for example, a digital camera using a solid-state imaging device such as a CCD or a CMOS. The passenger compartment camera 50 images an occupant, for example, periodically. An image captured by the passenger compartment camera 50 is used, for example, to recognize a gesture of the occupant. The image captured by the passenger compartment camera 50 is output to the driving support control unit 100.

Before the driving support control unit 100 will be described, the travel driving force output device 200, the brake device 210, and the steering device 220 will be first described below. The travel driving force output device 200 outputs a travel driving force (a torque) for allowing the host vehicle M to travel to driving wheels. The travel driving force output device 200 includes, for example, a combination of an internal combustion engine, an electric motor, and a transmission and a power electronic control unit (ECU) that controls the combination. The power ECU controls the elements on the basis of information input from the driving support control unit 100 or information input from the driving operators 40.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor on the basis of information input from the driving support control unit 100 or information input from the driving operators 40 such that a brake torque based on a braking operation is output to vehicle wheels. The brake device 210 may include a mechanism for transmitting a hydraulic pressure generated by an operation of the brake pedal included in the driving operators 40 to the cylinder via a master cylinder as a backup. The brake device 210 is not limited to the above-mentioned configuration, and may be an electronically controlled hydraulic brake device that controls an actuator on the basis of information input from the driving support control unit 100 such that the hydraulic pressure of the master cylinder is transmitted to the cylinder.

The steering device 220 includes, for example, a steering ECU and an electric motor. The electric motor changes a direction of steerable wheels, for example, by applying a force to a rack-and-pinion mechanism. The steering ECU drives the electric motor on the basis of information input from the driving support control unit 100 or information input from the driving operators 40 to change the direction of the steerable wheels.

[Configuration of Driving Support Control Unit]

The driving support control unit 100 includes, for example, an outside recognizing unit 110, a vehicle position recognizing unit 120, a following travel support control unit 130, a lane keeping support control unit 140, a lane change support control unit 150, an HMI control unit 160, and a storage unit 170. Among these elements, the elements other than the storage unit 170 are embodied, for example, by causing a hardware processor such as a central processing unit (CPU) to execute a program (software). Some or all of the elements other than the storage unit 170 may be embodied in hardware (which includes circuitry) such as a large scale integration (LSI), an application specific integrated circuit (ASIC), a field-programmable gate array (FPGA), or a graphics processing unit (GPU) or may be embodied in cooperation of software and hardware. A combination of a lane change start determining unit 152 and a lane change operation determining unit 153 is an example of a "lane changeability determining unit." A combination of the HMI 20 and the HMI control unit 160 is an example of an "information output unit."

The outside recognizing unit 110 recognizes states such as positions, speeds, and accelerations of neighboring vehicles on the basis of information input from the camera 10, the radar 12, and the finder 14 via the object recognition device 16. A position of a neighboring vehicle may be expressed by a representative point such as the center of gravity or a corner of the neighboring vehicle or may be expressed by an area which is marked by an outline of the neighboring vehicle. A "state" of a neighboring vehicle may include an acceleration, a jerk, or a "behavior condition" (for example, whether accelerating lane change is being performed or is intended) of the neighboring vehicle. The outside recognizing unit 110 may recognize states of different types of objects such as guard rails, utility poles, parked vehicles, pedestrians, and other objects, in addition to the neighboring vehicles.

The vehicle position recognizing unit 120 identifies the position of the host vehicle M on the basis of signals received from global navigation satellite system (GNSS) satellites by a GNSS receiver (not illustrated). The position of the host vehicle M may be specified or complemented by an inertial navigation system (INS) using the outputs of the vehicle sensors 30. The vehicle position recognizing unit 120 recognizes, for example, a lane in which the host vehicle M is traveling (a traveling lane) and a relative position and a posture of the host vehicle M relative to the traveling lane. The vehicle position recognizing unit 120 recognizes, for example, lane markings LM from an image captured by the camera 10 and recognizes a lane defined by two markings LM closest to the host vehicle M among the recognized markings LM as the traveling lane. The vehicle position recognizing unit 120 recognizes the position or the posture of the host vehicle M relative to the recognized traveling lane.

Figure 2:
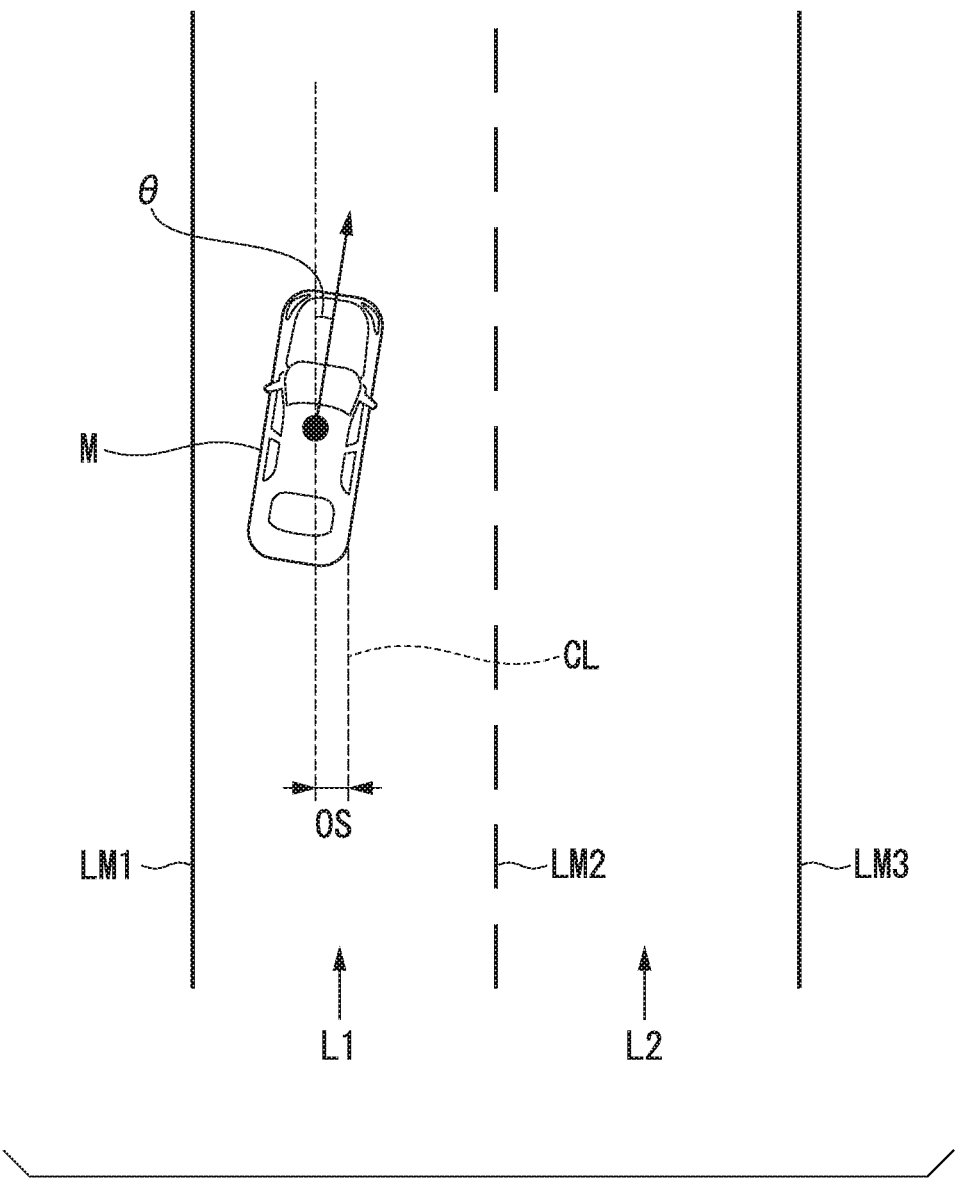
FIG. 2 is a diagram showing a state in which a position and a posture of a host vehicle relative to a traveling lane are recognized by a vehicle position recognizing unit.

FIG. 2 is a diagram showing a state in which the position and the posture of the host vehicle M relative to a traveling lane L1 are recognized by the vehicle position recognizing unit 120. The vehicle position recognizing unit 120 recognizes, for example, the markings LM1 to LM3 and recognizes an area between the markings LM1 and LM2 closest to the host vehicle M as the traveling lane (the current lane) L1 of the host vehicle M. Then, the vehicle position recognizing unit 120 recognizes a separation OS of a reference point (for example, the center of gravity) of the host vehicle M from a traveling lane center CL and an angle θ formed by the traveling direction of the host vehicle M and a line of the traveling lane center CL as the position and the posture of the host vehicle M relative to the traveling lane L1. Instead, the vehicle position recognizing unit 120 may recognize a position of the reference point on the host vehicle M relative to one edge of the traveling lane L1 or the like as the position of the host vehicle M relative to the traveling lane.

The vehicle position recognizing unit 120 may recognize the relative position and the relative speed between the host vehicle M and a neighboring vehicle on the basis of the recognized position and speed of the host vehicle M and a position and a speed of the neighboring vehicle recognized by the outside recognizing unit 110.

The vehicle position recognizing unit 120 may recognize, for example, a neighboring lane adjacent to the current lane. For example, the vehicle position recognizing unit 120 may recognize an area between a marking closest to the host vehicle M other than the markings of the current lane and the markings of the current lane as a neighboring lane. In the example illustrated in FIG. 2, the vehicle position recognizing unit 120 recognizes an area between the marking LM2 of the current lane and the marking LM3 closest to the host vehicle M other than the marking LM2 as a right neighboring lane L2.

For example, in a case that an instruction to start implementing a driving support mode for following travel has been received on the basis of an operation of the following travel start switch 21 by an occupant, the following travel support control unit 130 controls the travel driving force output device 200 and the brake device 210 such that the host vehicle M follows a preceding vehicle, and accelerates or decelerates the host vehicle M within a predetermined vehicle speed range (for example, 50 to 110 [km/h]). Here, "following travel" is, for example, a traveling form in which a relative distance between the host vehicle M and a preceding vehicle (an inter-vehicle distance) is kept constant. In a case that no preceding vehicle is recognized by the outside recognizing unit 110, the following travel support control unit 130 may cause the host vehicle M to travel within a preset vehicle speed range.

The following travel support control unit 130 may end following travel support control, for example, in response to an operation of the following travel start switch 21 by an occupant.

In a case that an instruction to start a driving support mode for lane keeping has been received, for example, on the basis of an operation of the lane keeping start switch 22 by an occupant, the lane keeping support control unit 140 controls the steering device 220 such that the host vehicle M does not depart from the current lane recognized by the vehicle position recognizing unit 120. For example, the lane keeping support control unit 140 controls steering of the host vehicle M such that the host vehicle M travels at the center of the current lane.

In a case that the host vehicle M is traveling at a position biased to one lateral side from the center of the current lane, the lane keeping support control unit 140 executes lane departure prevention control. The lane departure prevention control is a driving support control of supporting steering control such that the host vehicle M travels within the current lane by applying a steering torque in a direction opposite to a departure direction among the rightward and leftward directions when the host vehicle M is going to depart from the current lane. As the lane departure prevention control, for example, when the host vehicle M gets close to the marking LM before a distance between the markings LM defining the current lane and the host vehicle M becomes equal to or less than a predetermined distance, the lane keeping support control unit 140 attracts an occupant's attention by causing the steering wheel to vibrate. At this time, the HMI control unit 160 may notify the occupant that the host vehicle M is going to depart from the current lane by displaying an image on various display devices of the HMI 20 or outputting sound from the speaker. In a case that an occupant's operation of the steering wheel is not performed (in a case that the steering angle or the steering torque is less than a threshold value) after the steering wheel has vibrated, the lane keeping support control unit 140 changes the direction of the steerable wheels to the lane center by controlling the steering device 220 and controls the steering such that the host vehicle M returns to the lane center.

The lane keeping support control unit 140 may end lane keeping support control, for example, in response to an occupant's operation of the lane keeping start switch 22.

For example, when an occupant's lane changing operation has been received, the lane change support control unit 150 may execute lane change based on automatic lane change support control. Receiving a lane changing operation is to receive an instruction to start implementing a driving support mode for lane change, for example, due to an occupant's operation of the winker lever 41 or the lane change start switch 23. Receiving a lane changing operation may be to receive the lane changing operation by correlating a gesture of the occupant recognized by analyzing an image captured by the passenger compartment camera 50 with a predetermined lane changing operation. For example, in a case that an occupant has made a gesture such as "moving a hand from left to right," "inclining the head to the right while facing the front," or "turning a face to the right," the lane change support control unit 150 may receive an operation of changing the lane to the right neighboring lane. The lane changing operation received by the lane change support control unit 150 is an operation which is received before the lane change has been executed. For example, in a case that the winker lever 41 is not returned to a position at which a direction is not indicated after the lane change has been completed, this state is not received as a lane changing operation.

The lane change support control unit 150 includes, for example, a road information acquiring unit 151, a lane change start determining unit 152, a lane change operation determining unit 153, and a lane change executing unit 154.

The road information acquiring unit 151 acquires a type of a road in response to a traveling position by map matching with reference to map information 171 stored in the storage unit 170 on the basis of the traveling position of the host vehicle M acquired by the vehicle position recognizing unit 120. A type of a road is information indicating a type of a road such as an expressway, a toll road, a national road, and a prefectural road. The map information 171 is information in which shapes of roads are expressed by links indicating roads and nodes connected by the links. The map information 171 may include road information, traffic regulation information, address information (addresses and postal codes), facility information, and phone number information which are correlated with position information. The road information includes information indicating a type of a road such as an expressway, a toll road, a national road, and a prefectural road or information such as reference speeds of roads, the number of lanes, widths of lanes, gradients of roads, positions of roads (three-dimensional coordinates including longitude, latitude, and height), radii of curvature of curves of roads or lanes of the roads, positions of merging and branch points of lanes, and signs marked on roads. The reference speed is, for example, a legal speed limit or an average speed of a plurality of vehicles which traveled on the roads in the past. The map information 171 may not be provided in the driving support control unit 100 and, for example, map information stored in a navigation device (not illustrated) provided in the vehicle control system 1 may be used.

When the winker lever 41 is operated, the lane change start determining unit 152 determines whether automatic lane change support control to a lane on the winker side operating in response to a lever operation (for example, a right neighboring lane when the right winker is operated) from the right and left winkers of the host vehicle M is to be switched to a starting state. The lane change start determining unit 152 may determine whether automatic lane change support control is to be switched to the starting state before the winker lever 41 is operated. Details of the function of the lane change start determining unit 152 will be described later.

When automatic lane change support control has been switched to the starting state by the lane change start determining unit 152, the lane change operation determining unit 153 determines whether switching of automatic lane change support control to an operating state is possible. Switching of automatic lane change support control to the operating state is, for example, to cause the host vehicle M to travel on the lane as a lane change destination by executing steering control and speed control of the host vehicle M. Details of the function of the lane change operation determining unit 153 will be described later.

When automatic lane change support control has been switched to the operating state by the lane change operation determining unit 153, the lane change executing unit 154 executes automatic lane change support control to the lane on the side of the winker which operates in response to an operation of the winker lever 41. Details of the function of the lane change executing unit 154 will be described later.

For example, the lane change support control unit 150 may end automatic lane change support control in response to an occupant's operation of the winker lever 41 or the lane change start switch 23.

The driving support control unit 100 may execute one of lane keeping support control using the lane keeping support control unit 140 and lane change support control using the lane change support control unit 150 while executing following travel support control using the following travel support control unit 130.

The HMI control unit 160 outputs process details or process results in the driving support control unit 100 to the display unit 24 of the HMI 20. The HMI control unit 160 receives information which is input from the following travel start switch 21, the lane keeping start switch 22, the lane change start switch 23, and the display unit 24. Details of the function of the HMI control unit 160 will be described later.

The storage unit 170 is embodied by a hard disk drive (HDD), a flash memory, a random access memory (RAM), a read only memory (ROM), and the like. For example, the map information 171 and other information are stored in the storage unit 170.

[Driving Support Control on Host Vehicle M]

Figure 3:
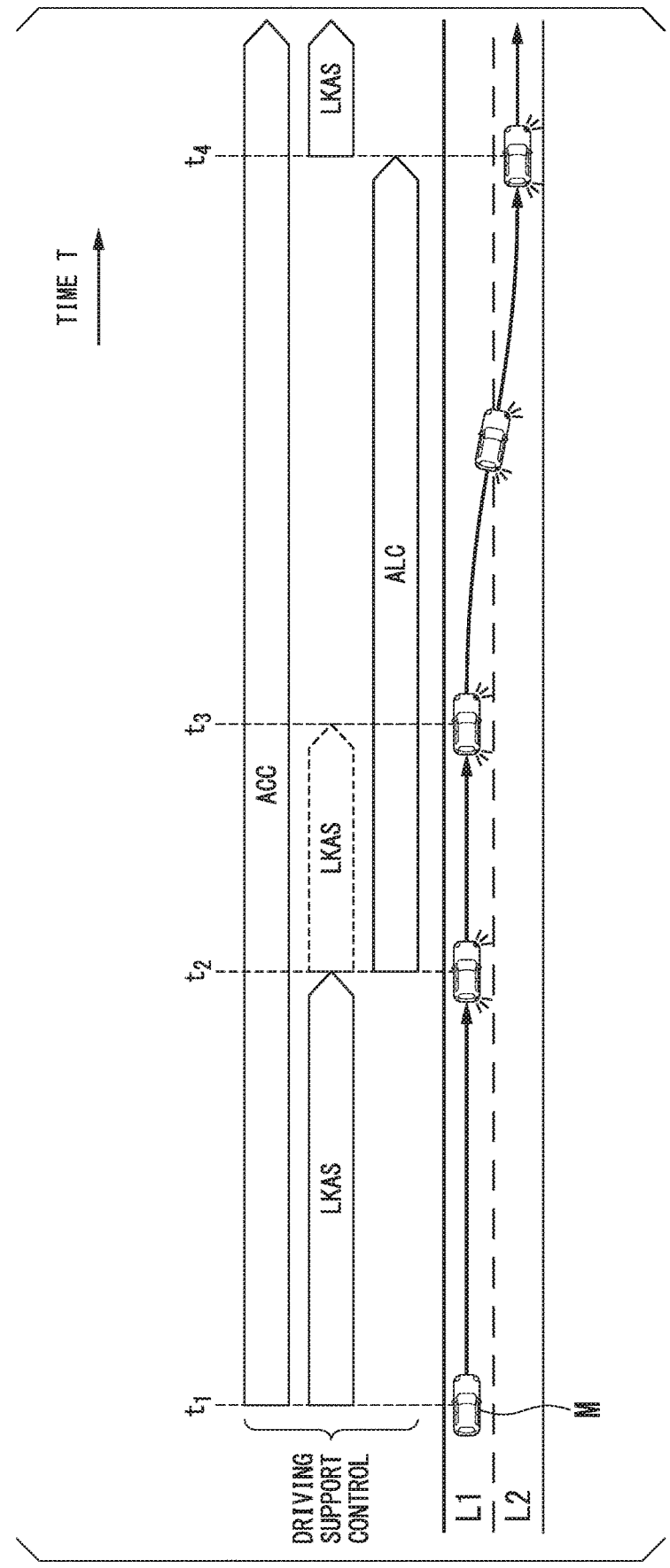
FIG. 3 is a diagram showing driving support control which is executed by a driving support control unit.

Driving support control on the host vehicle M will be specifically described. FIG. 3 is a diagram showing driving support control using the driving support control unit 100. In the example illustrated in FIG. 3, operating states of driving support control at times t1 to t4 are illustrated. In the drawing, adaptive cruise control (ACC) represents following travel support control, lane keeping assistance system (LKAS) represents lane keeping support control, and auto lane changing (ALC) represents automatic lane change support control. In FIG. 3, a traveling path of the host vehicle M is illustrated.

For example, an occupant of the host vehicle M traveling in the lane L1 operates the following travel start switch 21 and the lane keeping start switch 22 at a time point of time t1. When an operation of starting driving support using the following travel start switch 21 and the lane keeping start switch 22 has been received, the driving support control unit 100 executes following travel support control using the following travel support control unit 130 and lane keeping support control using the lane keeping support control unit 140. In the example illustrated in FIG. 3, since there is no preceding vehicle, the host vehicle M travels in the lane L1 within a preset vehicle speed range.

The occupant performs a lane changing operation using the winker lever 41 at a time point of time t2. The host vehicle M operates the corresponding winker in a direction which is indicated by the operation of the winker lever 41. In a case that the operation of the winker lever 41 has been received, the driving support control unit 100 executes lane change support control using the lane change support control unit 150.

For example, the lane change start determining unit 152 determines whether all of the following starting conditions (first conditions) of lane change support control are satisfied, and determines that lane change support control is switched to the starting state in a case of it is determined that all the starting conditions are satisfied and that lane change support control is not switched to the starting state when it is determined that any one of the starting conditions is not satisfied.

Starting condition (a): An operation of starting lane keeping support control of the host vehicle M has been received.

Starting condition (b): Following travel support control of the host vehicle M is being executed.

Starting condition (c): The host vehicle M is traveling on an expressway.

Starting condition (d): The speed of the host vehicle M is within a predetermined speed range.

[Method of Determining Starting Condition (a)]

For example, in order to determine whether Starting condition (a) has been satisfied, the lane change start determining unit 152 determines whether an operation of starting lane keeping support control has been received by the lane keeping start switch 22. For example, the lane change start determining unit 152 determines that Starting condition (a) has been satisfied when the operation of starting lane keeping support control has been received by the lane keeping start switch 22, and determines that Starting condition (a) has not been satisfied when the operation of starting lane keeping support control has not been received by the lane keeping start switch 22.

[Method of Determining Starting Condition (b)]

For example, in order to determine whether Starting condition (b) has been satisfied, the lane change start determining unit 152 determines whether the host vehicle M follows a preceding vehicle under the control of the following travel support control unit 130. The lane change start determining unit 152 determines that Starting condition (b) has been satisfied when the host vehicle M follows a preceding vehicle under the control of the following travel support control unit 130, and determines that Starting condition (b) has not been satisfied when the host vehicle M does not follow a preceding vehicle. The lane change start determining unit 152 may determine that Starting condition (b) has been satisfied when the following travel support control unit 130 determines that there is no preceding vehicle and the host vehicle M travels merely within a preset vehicle speed range.

[Method of Determining Starting Condition (c)]

For example, in order to determine whether Starting condition (c) has been satisfied, the lane change start determining unit 152 determines whether the host vehicle M is traveling on an expressway on the basis of the road information acquired by the road information acquiring unit 151. The lane change start determining unit 152 determines that Starting condition (c) has been satisfied when it is determined that the host vehicle M is traveling on an expressway, and determines that Starting condition (c) has not been satisfied when it is determined that the host vehicle M is traveling on a road other than an expressway.

[Method of Determining Starting Condition (d)]

For example, the lane change start determining unit 152 determines whether Starting condition (d) has been satisfied depending on whether the speed of the host vehicle M is within a predetermined speed range. The predetermined speed range is set to, for example, a speed range of about 70 to 110 [km/h]. The lane change start determining unit 152 determines that Starting condition (d) has not been satisfied when the speed of the host vehicle M is not within the predetermined speed range, and determines that Starting condition (d) has been satisfied when the speed of the host vehicle M is within the predetermined speed range.

When lane change is switched to the starting state, the lane change start determining unit 152 causes the lane keeping support control unit 140 to continuously execute lane keeping support control in a state in which the winker is operating until a predetermined time elapses after the winker lever 41 has been operated. The predetermined time is a time for the intention of lane change of the host vehicle M is known to neighboring vehicles and is a time of about 1 to 3 [sec]. In the following description, the predetermined time is referred to as a "waiting time."

The lane change operation determining unit 153 determines whether lane change support control is to be switched to the operating state when the lane change start determining unit 152 determines that lane change support control has been switched to the starting state and after the waiting time has elapsed. Switching of lane change support control to the operating state is, for example, to cause the host vehicle M to travel on a lane as a lane change destination by executing steering control and speed control of the host vehicle M. For example, the lane change start determining unit 152 determines whether all the following operating conditions (second conditions) of lane change support control, switches lane change support control to the operating state in a case that it is determined that all the operating conditions have satisfied, and does not switch lane change support control to the operating state when any one operating condition has not been satisfied.

Operating condition (1): A lane as a lane change destination is recognized (is actually present).

Operating condition (2): A marking LM partitioning the lane as a lane change destination and the current lane is not a road sign indicating prohibition of lane change (prohibition of departure therefrom).

Operating condition (3): There is not obstacle in the lane as a lane change destination.

Operating condition (4): A radius of curvature of a road on which the vehicle is traveling is equal to or greater than a predetermined value.

Operating condition (5): Another driving support control having a higher priority than steering support for lane change is not executed.

[Method of Determining Operating Condition (1)]

For example, the lane change operation determining unit 153 determines that Operating condition (1) has not been satisfied when the winker lever 41 or the lane change start switch 23 has been operated to instruct lane change and the lane designated as a lane change destination has not been recognized by the vehicle position recognizing unit 120. The lane change operation determining unit 153 determines that Operating condition (1) has been satisfied when the lane designated as a lane change destination has been recognized by the vehicle position recognizing unit 120. Accordingly, for example, when lane change to a side on which there is no neighboring lane has been instructed by an occupant's erroneous operation, the lane designated as a lane change destination is not recognized by the vehicle position recognizing unit 120 and thus lane change is stopped.

[Method of Determining Operating Condition (2)]

For example, the lane change operation determining unit 153 determines that Operating condition (2) has been satisfied depending on the type of a marking between the current lane and a neighboring lane as a lane change destination recognized by the vehicle position recognizing unit 120, that is, a marking which needs to be crossed at the time of lane change. For example, the lane change operation determining unit 153 determines that Operating condition (2) has not been satisfied when the marking between the current lane and a neighboring lane as a lane change destination is a road sign (for example, a yellow solid line) indicating prohibition of lane change or prohibition of departure, and determines that Operating condition (2) has been satisfied when the marking is a road sign (for example, a white dotted line) indicating otherwise.

[Method of Determining Operating Condition (3)]

For example, in order to determine whether Operating condition (3) has been satisfied, the lane change operation determining unit 153 sets a target position as a lane change destination (hereinafter referred to as a lane change target position TAs) in a neighboring lane and determines whether there is a neighboring vehicle as an obstacle at the lane change target position TAs.

Figure 4:
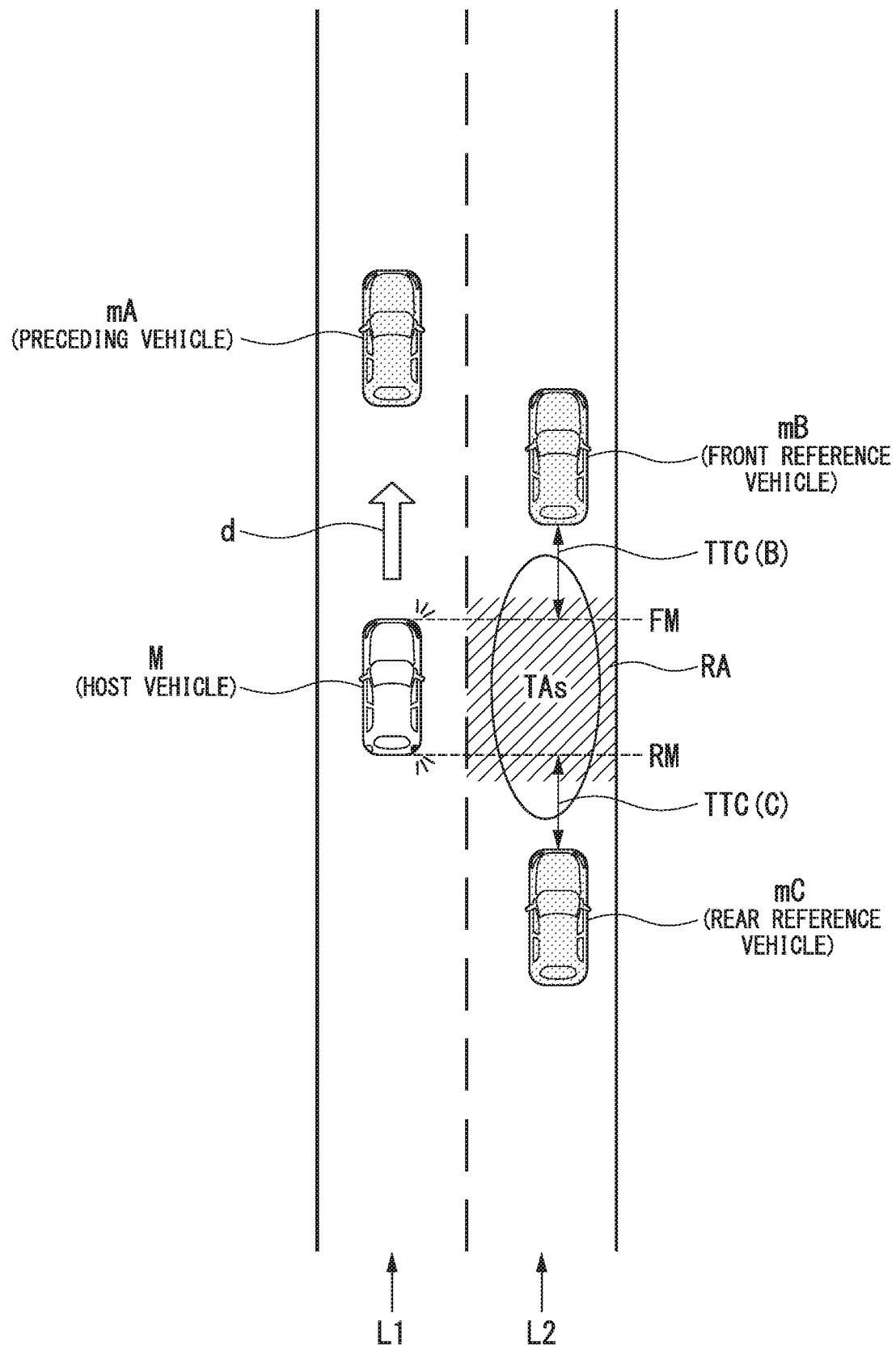
FIG. 4 is a diagram schematically showing a state in which a lane change target position is set in a neighboring lane.

FIG. 4 is a diagram schematically showing a state in which the lane change target position TAs is set in a neighboring lane. In the drawing, L1 denotes the current lane, and L2 denotes a right neighboring lane as a lane change destination of the host vehicle M. An arrow d denotes a traveling direction of the host vehicle M.

For example, in a case that lane change to the right neighboring lane L2 has been instructed by an operation of the winker lever 41, the lane change operation determining unit 153 selects two vehicles (for example, two vehicles relatively close to the host vehicle M) from neighboring vehicles on the right neighboring lane L2 and sets a lane change target position TAs between the two selected neighboring vehicles. For example, the lane change target position TAs is set at the center of the neighboring lane L2. In the following description, it is assumed that the neighboring vehicle located immediately before the set lane change target position TAs is referred to as a "front reference vehicle mB" and the neighboring vehicle located immediately after the lane change target position TAs is referred to as a "rear reference vehicle mC." The lane change target position TAs is a relative position based on a positional relationship between the host vehicle M and the front reference vehicle mB and the rear reference vehicle mC.

The lane change operation determining unit 153 sets a prohibition area RA as illustrated in the drawing on the basis of the set position of the lane change target position TAs after the lane change target position TAs has been set. For example, the lane change operation determining unit 153 projects the host vehicle M to the neighboring lane L2 as a lane change destination and sets an area with a slight margin before and after the projected host vehicle M as the prohibition area RA. The prohibition area RA is set to an area extending from one marking LM defining the neighboring lane L2 to the other marking LM.

Then, the lane change operation determining unit 153 determines that Operating condition (3) has been satisfied when there is no part of the neighboring vehicles in the set prohibition area RA, a time-to-collision TTC(B) between the host vehicle M and the front reference vehicle mB is greater than a threshold value Th(B), and a time-to-collision TTC(C) between the host vehicle M and the rear reference vehicle mC is greater than a threshold value Th(C). "There is no part of the neighboring vehicles in the set prohibition area RA" means, for example, that the prohibition area RA and an area indicating the neighboring vehicle do not overlap each other when seen from the upper side. The time-to-collision TTC(B) is calculated, for example, by dividing a distance between an extension line FM virtually extending from the front end of the host vehicle M to the neighboring lane L2 side and the front reference vehicle mB by a relative speed between the host vehicle M and the front reference vehicle mB. The time-to-collision TTC(C) is calculated, for example, by dividing a distance between an extension line RM virtually extending from the rear end of the host vehicle M to the neighboring lane L2 side and the rear reference vehicle mC by a relative speed between the host vehicle M and the rear reference vehicle mC. The threshold values Th(B) and Th(C) may be the same value or different values.

When Operating condition (3) has not been satisfied, the lane change operation determining unit 153 repeatedly performs the process of determining whether Operating condition (3) has been satisfied by selecting two other vehicles from the neighboring vehicles located on the right neighboring lane L2 and setting a new lane change target position TAs. At this time, the driving support control unit 100 may control the speed of the host vehicle M such that the current speed is maintained or may accelerate or decelerate the host vehicle M such that the host vehicle M moves to the lateral side of the lane change target position TAs until the lane change target position TAs satisfying Operating condition (3) is set.

When there is no neighboring vehicle on the neighboring lane L2 at the time of setting the lane change target position TAs, the lane change operation determining unit 153 may determine that Operating condition (3) has been satisfied because there is not neighboring vehicle interfering with the prohibition area RA. When there is only one neighboring vehicle on the neighboring lane L2 at the time of setting the lane change target position TAs, the lane change operation determining unit 153 may set the lane change target position TAs at an arbitrary position in the front or rear of the neighboring vehicle.

[Method of Determining Operating Condition (4)]

For example, the lane change operation determining unit 153 determines whether Operating condition (4) has been satisfied depending on whether the radius of curvature of a road on which the host vehicle is traveling is equal to or greater than a predetermined value. The radius of curvature of the road on which the host vehicle is traveling can be acquired, for example, from the map information 171 stored in the storage unit 170. The predetermined value is set to, for example, a radius of curvature (for example, about 500 [m]) at which an occupant is not overloaded when the host vehicle M travels along the road. The predetermined value is set to a value which decreases (for example, about 200 [m]) as the speed of the host vehicle M decreases, and may be set to a value (for example, about 1000 [m]) which increases as the speed of the host vehicle M increases.

[Method of Determining Operating Condition (5)]

For example, the lane change operation determining unit 153 determines whether Operating condition (5) has been satisfied depending on whether another driving support control having a higher priority than steering support control for lane change. For example, the driving support control having a highest priority is automatic brake control due to an object such as an obstacle. Automatic brake control is, for example, control of decelerating or stopping the host vehicle M such that the host vehicle does not come into contact with an object such as an obstacle. For example, the lane change operation determining unit 153 determines that Operating condition (5) has not been satisfied when automatic brake control is being executed at the time of determining whether lane change is to be executed, and determines that Operating condition (5) has been satisfied when automatic brake control is not being executed.

It is assumed that the lane change operation determining unit 153 determines that all of Operating conditions (1) to (5) have not been temporarily satisfied. Examples of this case include a case in which there is a rapid curve with a short distance or a case in which the host vehicle travels in parallel to a neighboring vehicle traveling on the lane as a lane change destination. In this case, the lane change operation determining unit 153 repeatedly determines whether all of Operating conditions (1) to (5) have been satisfied until a predetermined time (for example, about 5 to 10 [sec]) has elapsed. In a case that the repeated determination is being performed, the driving support control unit 100 causes the lane keeping support control unit 140 to continuously execute lane keeping support control. When all of Operating conditions (1) to (5) have been satisfied at a certain time point in the predetermined time, the lane change operation determining unit 153 switches automatic lane change support control to the operating state.

In a case that automatic lane change support control has been switched to the operating state, the lane change executing unit 154 executes lane change of the host vehicle M from the lane L1 to the lane L2 by steering control. For example, the lane change executing unit 154 calculates a distance required for lane change of the host vehicle M by multiplying the speed of the host vehicle M by the number of seconds required for the lane change. The number of seconds required for the lane change is set in advance on the premise that a lateral moving distance and a lateral speed at the time of execution of lane change are constant. The lane change executing unit 154 sets an end point of lane change to the lane as a lane change destination on the basis of the calculated distance required for the lane change.

The lane change executing unit 154 generates a path for the lane change, for example, by smoothly connecting two points using a polynomial curve such as a spline curve on the basis of the current position and the reference direction of the yaw angle of the host vehicle M and the position of the set end point of the lane change and the reference direction of the yaw angle. For example, the lane change executing unit 154 generates a plurality of path points at predetermined intervals on the generated path. As feed-forward control, the lane change executing unit 154 determines an amount of steering supported (a steering torque) required for causing the host vehicle to travel along the generated path points, for example, for each path point and outputs the determined amount of steering supported to the steering device 220. As feedback control, the lane change executing unit 154 calculates an amount of steering supported for decreasing the separation on the basis of the separation between the path points and the position of the host vehicle M and outputs the calculated amount of steering supported to the steering device 220.

In the example illustrated in FIG. 3, between time t2 and time t3, the lane change start determining unit 152 and the lane change operation determining unit 153 determine whether lane change to be executed. Between time t2 and time t3, lane keeping support control is continuously executed by the lane keeping support control unit 140. The lane change of the host vehicle M is executed by the steering control at a time point of time t3, and the lane change is completed at a time point of time t4. When the lane change has been completed, a control entity is switched to the lane keeping support control unit 140 and lane keeping support control is returned. When the lane change has been completed, the winker lever 41 or the lane change start switch 23 return to a state in which no direction is indicated.

Figure 5:
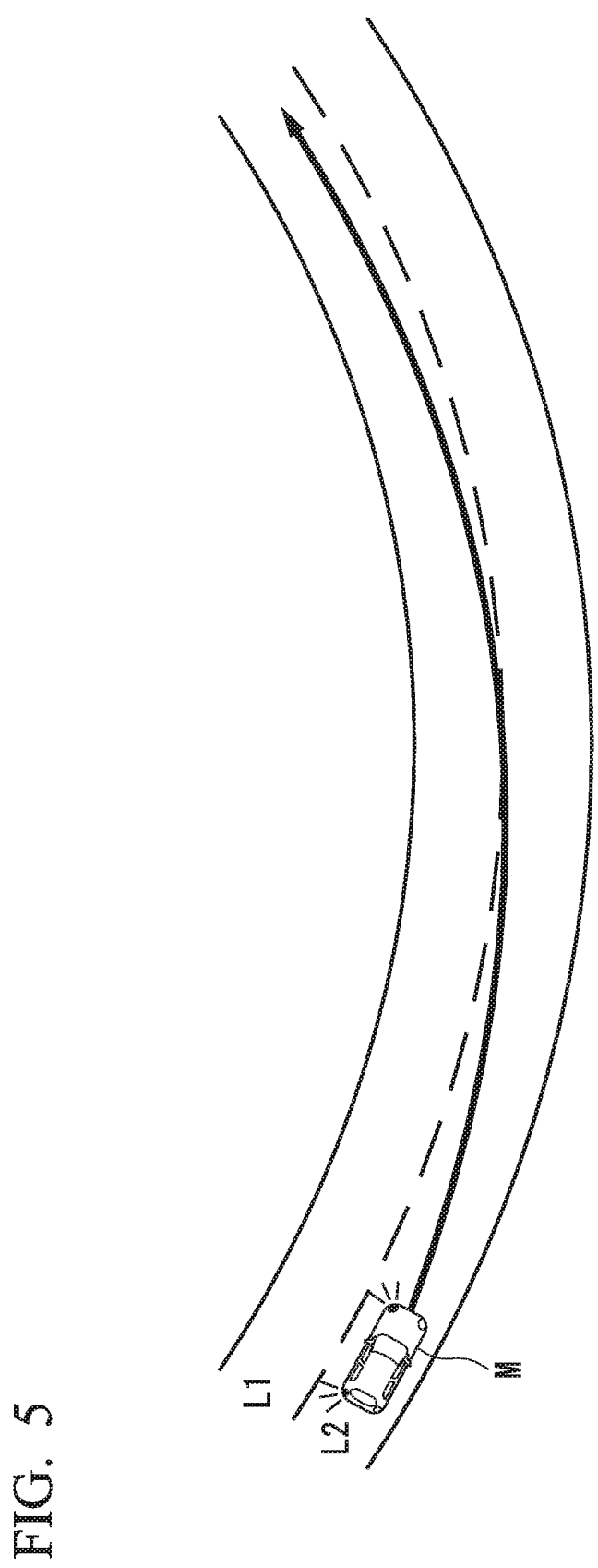
FIG. 5 is a diagram showing traveling details when automatic lane change support control for the host vehicle is executed.

FIG. 5 is a diagram showing traveling details when automatic lane change support control of the host vehicle M is executed. When an operation of the winker lever 41 is received in a state in which lane keeping control of the host vehicle M is being executed, the lane change support control unit 150 determines whether all of the starting conditions and the operating conditions of the automatic lane change support control have been satisfied, and executes lane change from the current lane (the lane L2) to a neighboring lane (the lane L1) which is located in the direction indicated by the operation of the winker lever 41 when all the conditions have been satisfied.

When any one of Starting conditions (a) to (d) and Operating conditions (1) to (5) has not been satisfied, automatic lane change support control is cancelled and lane keeping support control is continuously executed by the lane keeping support control unit 140.

Figure 6:
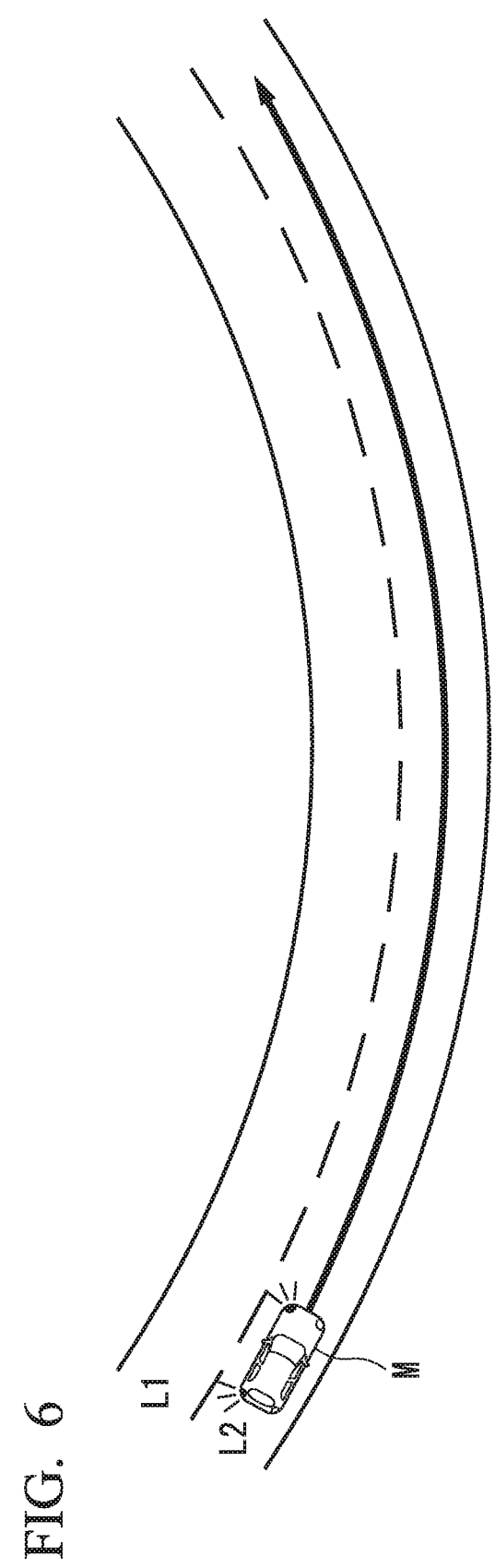
FIG. 6 is a diagram showing traveling details when automatic lane change support control for the host vehicle is not executed.

FIG. 6 is a diagram showing traveling details when automatic lane change support control of the host vehicle M is not executed. When any one of the starting conditions and the operating conditions has not been satisfied, the lane change support control unit 150 continuously executes lane keeping support control using the lane keeping support control unit 140. Accordingly, the host vehicle M can travel so as not to depart from the lane L2 in a curved road illustrated in FIG. 6. In this way, when an occupant has operated the winker lever 41 or the like with an intention to execute lane change but lane change has not been executed because any one condition has not been satisfied, lane keeping support control is continuously performed and driving support can be maintained. In this case, the HMI control unit 160 may notify the occupant one or both of a fact that lane change based on automatic lane change support control (automatic lane change) has not been executed and a fact that lane keeping support control is maintained through the use of the display unit 24.

Figure 7:
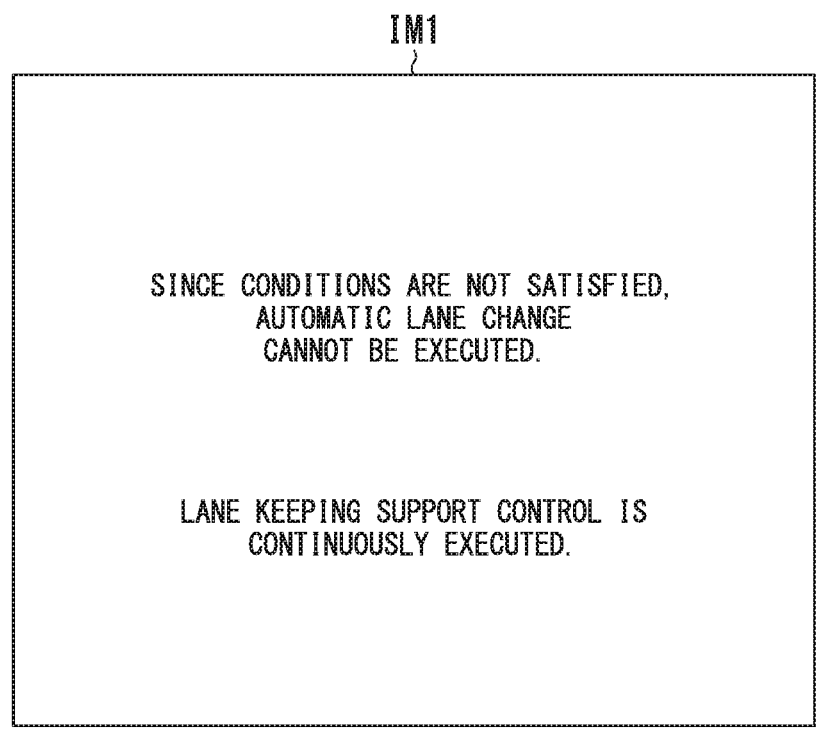
FIG. 7 is a diagram showing an example of a screen which is displayed on a display unit when automatic lane change support control according to the first embodiment is not to be executed.

FIG. 7 is a diagram showing an example of a screen which is displayed on the display unit 24 when automatic lane change support control according to the first embodiment is not executed. The HMI control unit 160 displays a screen IM1 illustrated in FIG. 7 on the display unit 24 when automatic lane change support control has not been executed. On the screen IM1, a message indicating that automatic lane change could not be executed because conditions have not been satisfied and a message indicating that lane keeping support control is maintained are displayed. The HMI control unit 160 may output sound with the same details as displayed on the screen IM1 from the speaker of the HMI 20. Accordingly, an occupant can easily understand that automatic lane change could not be executed because conditions have not been satisfied and lane keeping support control is maintained.

[Process Flow]

Figure 8:
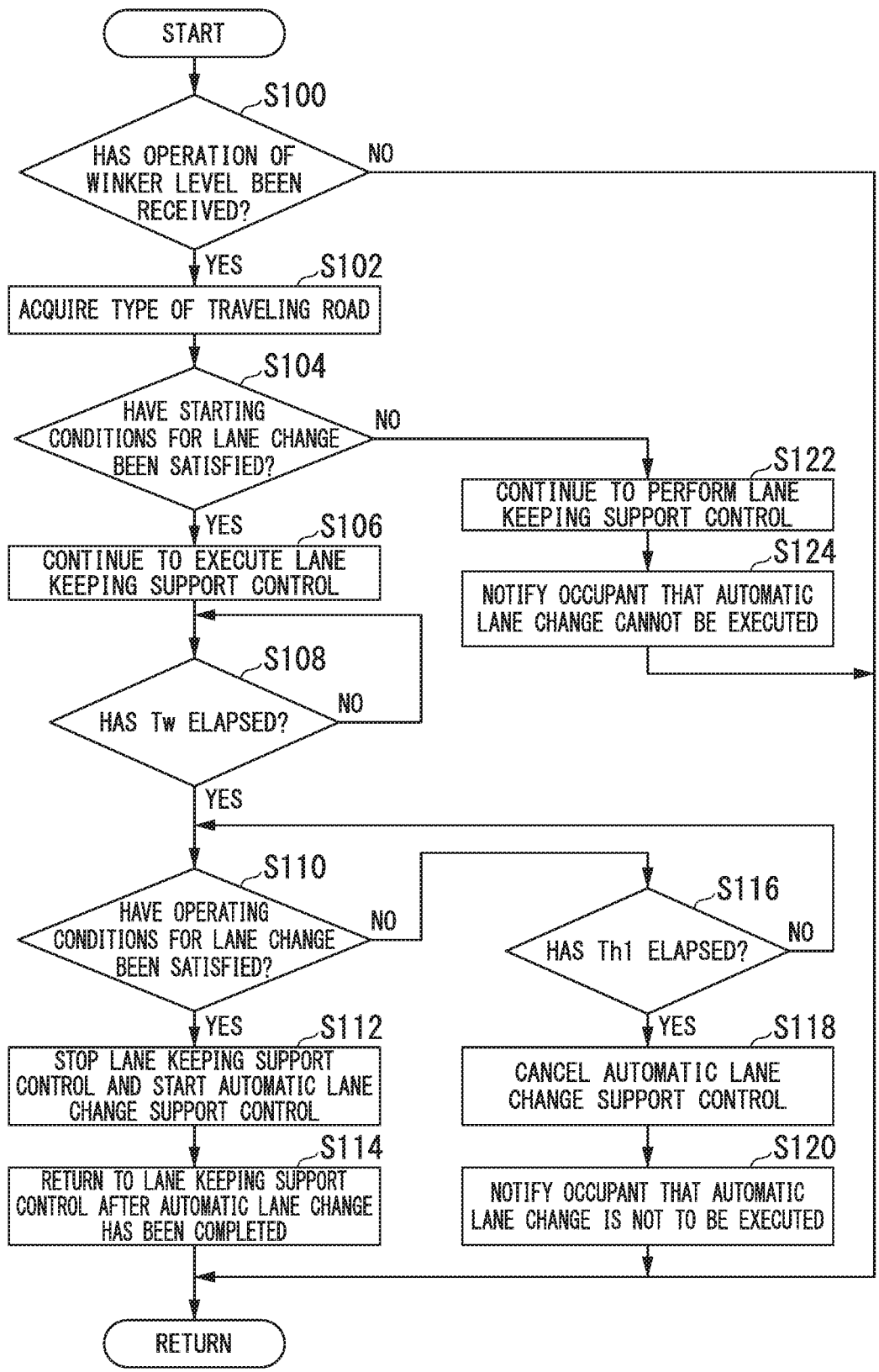
FIG. 8 is a flowchart showing an example of a flow of a driving support control process according to the first embodiment.

FIG. 8 is a flowchart showing an example of a flow of a driving support control process according to the first embodiment. The process flow in this flowchart is, for example, a driving support control process when a lane changing operation has been received during execution of lane keeping support control. The process flow in this flowchart may be repeatedly performed at a predetermined cycle or at predetermined times.

First, the driving support control unit 100 determines whether an occupant's operation of the winker lever 41 has been received (Step S100). When the operation of the winker lever 41 has been received, the road information acquiring unit 151 acquires a type of a road on which the host vehicle is traveling (Step S102).

Then, the lane change start determining unit 152 determines whether all of Starting conditions (a) to (d) have been satisfied (Step S104). When all the starting conditions have been satisfied, the lane change operation determining unit 153 maintains lane keeping support control (Step S106) and determines whether a waiting time Tw has elapsed after the operation of the winker lever 41 has been received (Step S108). The lane change operation determining unit 153 waits until the waiting time Tw has elapsed, and determines whether the host vehicle M has satisfied the operating conditions for lane change after the waiting time Tw has elapsed (Step S110). When the operating conditions for lane change have been satisfied, the lane keeping support control by the lane keeping support control unit 140 is stopped and the lane change executing unit 154 starts automatic lane change support control (Step S112). Then, after the automatic lane change has been completed, the lane change executing unit 154 returns to the lane keeping support control by the lane keeping support control unit 140 (Step S114).

When the operating conditions for lane change have not been satisfied, the lane change operation determining unit 153 determines whether a predetermined time Th1 has elapsed (Step S116). When the predetermined time Th1 has not elapsed, the process flow returns to the process of Step S110. When the predetermined time Th1 has elapsed, the automatic lane change support control is cancelled (Step S118). The HMI control unit 160 notifies the occupant that the automatic lane change could not be executed (Step S120).

When it is determined in Step S104 that the starting conditions for lane change have not been satisfied, the lane keeping support control unit 140 maintains the lane keeping support control (Step S122). The HMI control unit 160 notifies the occupant that the automatic lane change could not be executed (Step S124). Accordingly, the process flow in this flowchart ends. In the process flow illustrated in FIG. 8, when it is determined in Step S100 that the occupant's operation of the winker lever 41 has been received, the processes of Steps S102 to S120 may be performed under the condition that the operation of the winker lever 41 is maintained.

According to the above-mentioned first embodiment, since lane keeping support control is maintained even in a case that automatic lane change has not been executed in response to an occupant's lane changing operation, it is possible to prevent an unexpected configuration from occurring in vehicle behavior. According to the first embodiment, since it is determined whether automatic lane change support control is to be executed on the basis of the type of the road on which the host vehicle M is traveling, it is possible to implement more appropriate driving support.

According to the first embodiment, for example, when the winker lever 41 has been operated as a trigger of automatic lane change support control and the starting conditions for lane change have not been satisfied, lane keeping control is maintained. Accordingly, lane keeping control is maintained, for example, even when an occupant determines that lane change is possible but a system side erroneously recognizes that the starting conditions for lane change have not been satisfied due to erroneous map matching and the occupant does not understand erroneous recognition of the system and releases a hand from the steering wheel, and thus it is possible to prevent unexpected disturbance from occurring in vehicle behavior.

Second Embodiment

A second embodiment will be described below. The second embodiment is different from the first embodiment, in that a lane change support control unit 150A includes a grip determining unit 155. A difference from the first embodiment will be mainly described below and description of the functions and the like common to the first embodiment will not be repeated.

Figure 9:
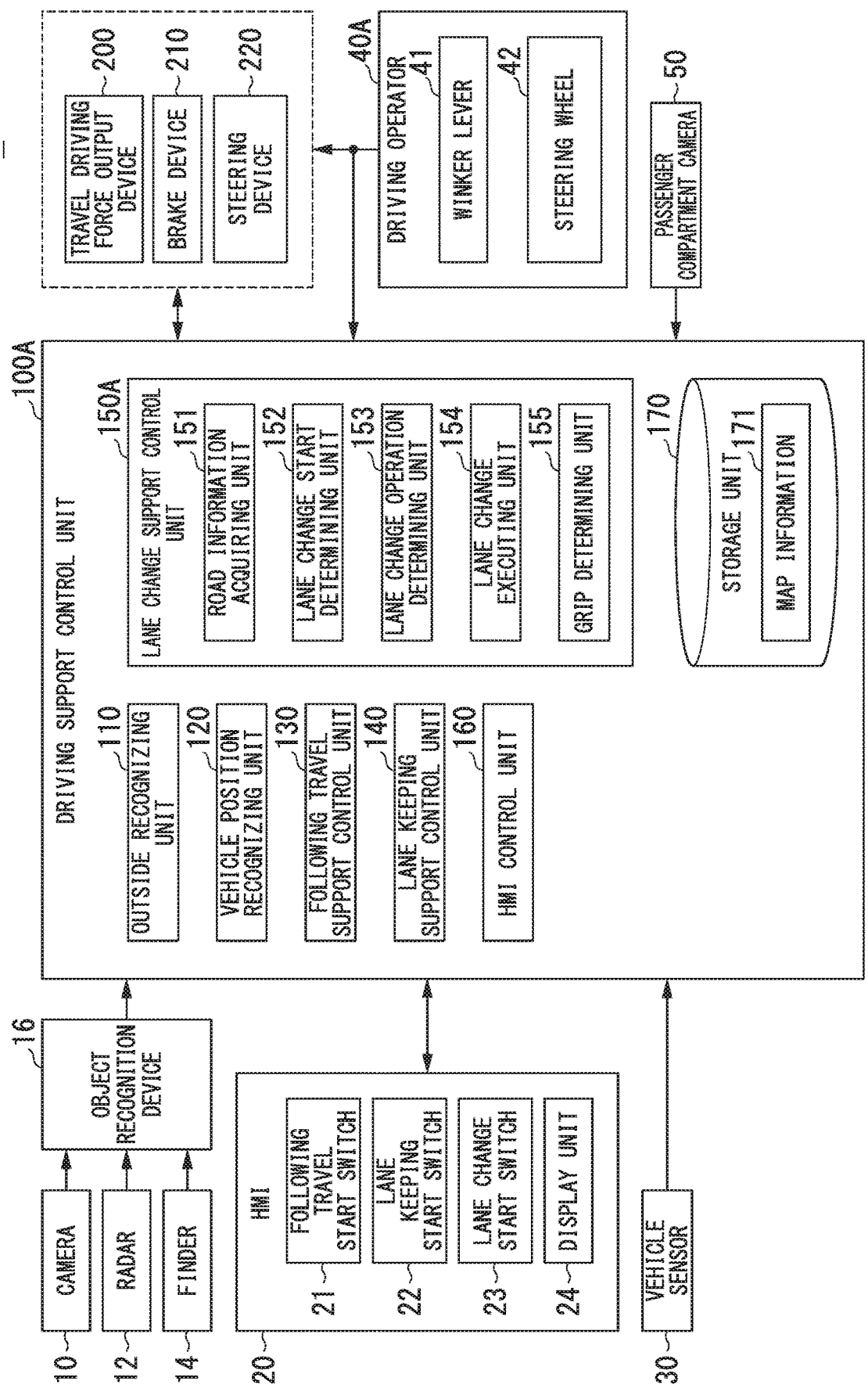
FIG. 9 is a diagram showing a configuration of a vehicle control system according to a second embodiment.

FIG. 9 is a diagram showing a configuration of a vehicle control system 2 according to the second embodiment. The vehicle control system 2 includes, for example, a camera 10, a radar 12, a finder 14, an object recognition device 16, an HMI 20, vehicle sensors 30, driving operators 40A, a passenger compartment camera 50, a driving support control unit 100A, a travel driving force output device 200, a brake device 210, and a steering device 220. In FIG. 9, a steering wheel 42 which is an example of a driving operator is illustrated in addition to the winker lever 41 in the driving operators 40A.

The driving support control unit 100A includes, for example, an outside recognizing unit 110, a vehicle position recognizing unit 120, a following travel support control unit 130, a lane keeping support control unit 140, a lane change support control unit 150A, an HMI control unit 160, and a storage unit 170. The lane change support control unit 150A includes a road information acquiring unit 151, a lane change start determining unit 152, a lane change operation determining unit 153, a lane change executing unit 154, and a grip determining unit 155.

The grip determining unit 155 determines whether an occupant is gripping the steering wheel 42 in a case that the lane change start determining unit 152 determines that the starting conditions for automatic lane change support control have not been satisfied. For example, a grip sensor (not illustrated) is provided in the steering wheel 42. The grip sensor is a capacitance sensor that is provided in the circumferential direction of the steering wheel 42. The grip sensor detects contact of an object with a detection target area as change in capacitance. The grip determining unit 155 determines that the occupant is gripping the steering wheel 42 in a case that the change in capacitance acquired from the grip sensor is equal to or greater than a predetermined amount, and determines that the occupant is not gripping the steering wheel 42 in a case that the change in capacitance is less than the predetermined amount.

The grip determining unit 155 may detect a steering angle or a steering torque of the steering wheel using an operation detector that is provided in the steering wheel 42, and determine that the occupant is gripping the steering wheel 42 for operation in a case that a difference between the detected steering angle or steering torque and a steering angle or steering torque controlled by the lane keeping support control unit 140 is equal to or greater than a predetermined amount.

In a case that the grip determining unit 155 determines that the occupant is gripping the steering wheel 42, the lane keeping support control unit 140 ends lane keeping support control. Accordingly, it is possible to smoothly switch driving to manual driving based on the occupant's steering operation.

In a case that the grip determining unit 155 determines that the occupant is not gripping the steering wheel 42, the lane keeping support control unit 140 maintains lane keeping support control. In this case, the HMI control unit 160 may output a message indicating that automatic lane change cannot be executed and a message indicating that the occupant has to grip the steering wheel to the display unit 24.

Figure 10:
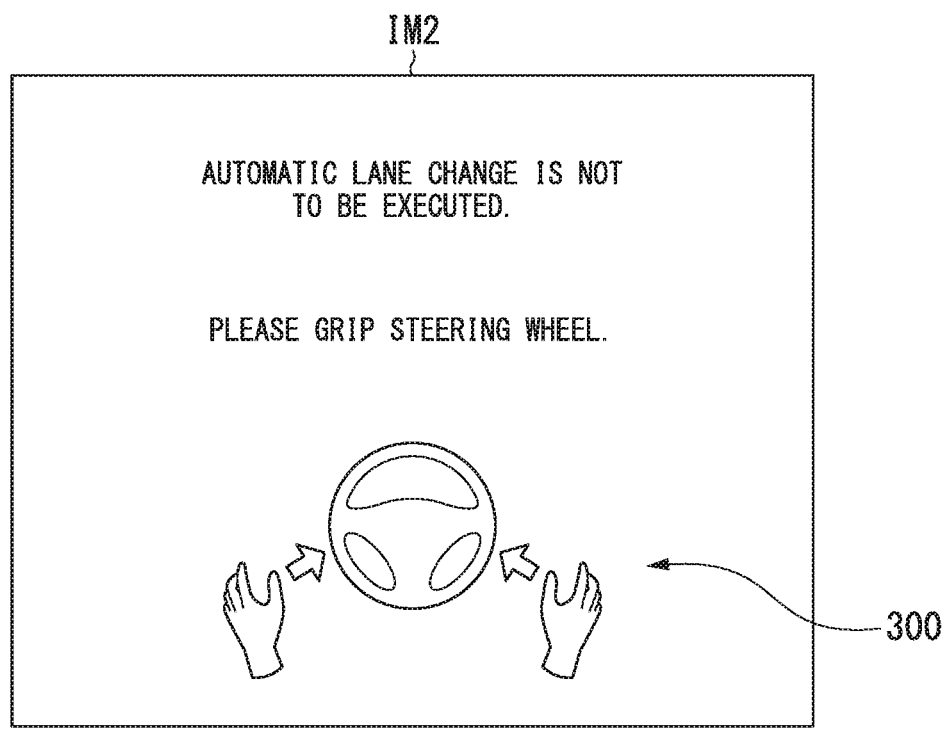
FIG. 10 is a diagram showing an example of a screen which is displayed on a display unit when automatic lane change support control according to the second embodiment is not to be executed.

FIG. 10 is a diagram showing an example of a screen which is displayed on the display unit 24 when automatic lane change support control according to the second embodiment cannot be executed. The HMI control unit 160 displays a screen IM2 illustrated in FIG. 10 on the display unit 24 in a case that automatic lane change support control cannot be executed. On the screen IM2, a message indicating that automatic lane change could not be executed because conditions have not been satisfied and a message indicating that the steering wheel 42 has to be gripped are displayed. Accordingly, an occupant can easily understand one or both of the fact that automatic lane change could not be executed because conditions have not been satisfied and the fact that the steering wheel has to be gripped. The HMI control unit 160 may display an image object 300 for urging the occupant to grip the steering wheel on the screen IM2 as illustrated in FIG. 10. Accordingly, the occupant can intuitively understand that an operation of gripping the steering wheel 42 is required.

The lane keeping support control unit 140 may end the lane keeping support control when it is determined that the occupant has not gripped the steering wheel 42 even when a predetermined time (for example, about 10 to 15 [sec]) has elapsed after the occupant has been notified by the HMI control unit 160.

In a case that the grip determining unit 155 determines that the occupant is gripping the steering wheel, the lane keeping support control unit 140 may temporarily stop the lane keeping support control. After the lane keeping support control has been stopped, the lane keeping support control unit 140 determines whether all the following returning conditions (third conditions) for lane keeping support control have been satisfied, and performs control of returning to the lane keeping support control when it is determined that all the returning conditions have been satisfied and not returning to the lane keeping support control in a case that it is determined that any of the returning conditions has not been satisfied.

Returning condition ($\alpha$): A direction indicating operation has not been performed by an occupant.

Returning condition ($\beta$): An amount of operation of a driving operator by an occupant is equal to or less than a predetermined amount.

Returning condition ($\gamma$): A condition for execution of lane keeping support control has been satisfied.

[Method of Determining Returning Condition ($\alpha$)]

For example, in order to determine whether Returning condition ($\alpha$) has been satisfied, the lane keeping support control unit 140 determines whether a direction indicating operation using the winker lever 41 has not been performed, determines that Returning condition ($\alpha$) has been satisfied when the direction indicating operation using the winker lever 41 has not been performed, and determines that Returning condition ($\alpha$) has not been satisfied when the direction indicating operation using the winker lever 41 has been performed.

[Method of Determining Returning Condition ($\beta$)]

For example, in order to determine whether Returning condition ($\beta$) has been satisfied, the lane keeping support control unit 140 acquires a steering angle or a steering torque detected by the operation detector of the steering wheel 42, and determines whether the acquired steering angle or the acquired steering torque is equal to or less than a predetermined amount. The lane keeping support control unit 140 determines that Returning condition ($\beta$) has been satisfied when the acquired steering angle or the acquired steering torque is equal to or less than the predetermined amount, and determines that Returning condition ($\beta$) has not been satisfied when the acquired steering angle or the acquired steering torque is greater than the predetermined amount.

[Method of Determining Returning Condition ($\gamma$)]

For example, in order to determine whether Returning condition ($\gamma$) has been satisfied, the lane keeping support control unit 140 determines whether the current lane has been recognized by the outside recognizing unit 110 and determines whether the vehicle speed acquired from the vehicle sensors 30 is within a predetermined speed range. The predetermined speed range is a speed range in which the lane keeping support control can be executed and, for example, ranges from about 50 to 110 [km/h]. The lane keeping support control unit 140 determines that Returning condition ($\gamma$) has been satisfied when the current lane has been recognized and the vehicle speed is within the predetermined speed range, and determines that Returning condition ($\gamma$) has not been satisfied when the current lane has not been recognized or the vehicle speed is outside the predetermined speed range.

[Process Flow]

Figure 11:
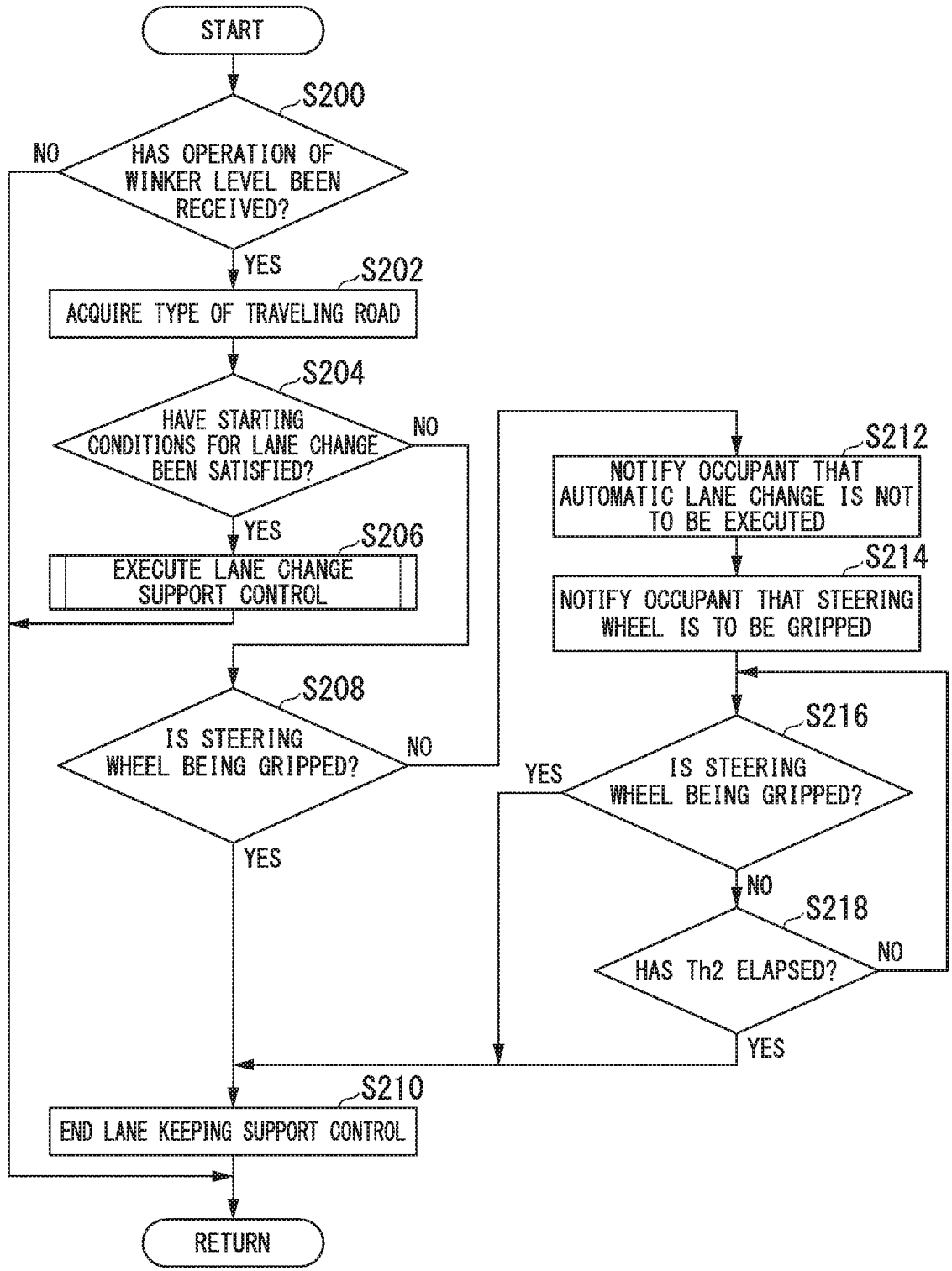
FIG. 11 is a flowchart showing an example of a flow of a driving support control process according to the second embodiment.

FIG. 11 is a flowchart showing an example of a flow of a driving support control process according to the second embodiment. The process flow in this flowchart is, for example, a driving support control process when a lane changing operation has been received during execution of lane keeping support control. The process flow in this flowchart may be repeatedly performed at a predetermined cycle or at predetermined times.

First, the driving support control unit 100 determines whether an occupant's operation of the winker lever 41 has been received (Step S200). When the operation of the winker lever 41 has been received, the road information acquiring unit 151 acquires a type of a road on which the host vehicle is traveling (Step S202).

Then, the lane change start determining unit 152 determines whether all of Starting conditions (a) to (d) have been satisfied (Step S204). When all the starting conditions have been satisfied, the lane change support control unit 150A performs a lane change support control executing process (Step S206). The lane change support control executing process is the same as the processes of Steps S108 to S120 in the driving support control process according to the first embodiment illustrated in FIG. 8 and thus description thereof will not be repeated herein.

When it is determined in Step S204 that the starting conditions have not been satisfied, the grip determining unit 155 determines whether the steering wheel 42 is gripped (Step S208). When it is determined that the steering wheel 42 is gripped, the lane keeping support control unit 140 ends the lane keeping support control (Step S210). When the steering wheel 42 is not gripped, the HMI control unit 160 notifies the occupant that automatic lane change cannot be executed (Step S212) and notifies the occupant that the steering wheel 42 has to be gripped (Step S214).

Then, the grip determining unit 155 determines whether the occupant is gripping the steering wheel 42 (Step S216). When it is determined that the occupant is gripping the steering wheel 42, the lane keeping support control unit 140 ends the lane keeping support control (Step S210). When it is determined that the occupant is not gripping the steering wheel 42, the grip determining unit 155 determines whether a predetermined time Th2 has elapsed after notification has been performed in Step S214 (Step S218). When the predetermined time Th2 has not elapsed, the process flow returns to Step S216. When the predetermined time Th2 has elapsed, the lane keeping support control unit 140 ends the lane keeping support control (Step S210). Accordingly, the process flow in this flowchart ends.

In the driving support control process according to the second embodiment, for example, in a case that the occupant is not gripping the steering wheel 42 after the winker lever 41 has been operated, the lane keeping support control unit 140 may determine that there is a likelihood that the occupant releases the hand from the steering wheel 42 on the premise that the vehicle control system 1 of the host vehicle M correctly recognizes an expressway and may maintain the lane keeping support control.

According to the above-mentioned second embodiment, in addition to the same advantages as in the first embodiment, it is possible to maintain the lane keeping support control even when a direction indicating operation using the winker lever 41 or the like has been performed, one of Starting conditions (a) to (d) has not been satisfied, and an occupant mistakes that automatic lane change support control is being executed and thus is not gripping the steering wheel 42. In a case that the occupant is gripping the steering wheel 42, the lane keeping support control can be ended and thus rapidly switched to manual driving. Accordingly, the driving support control unit 100A can execute driving support matching an occupant's intention.

<Hardware Configuration>

Figure 12:
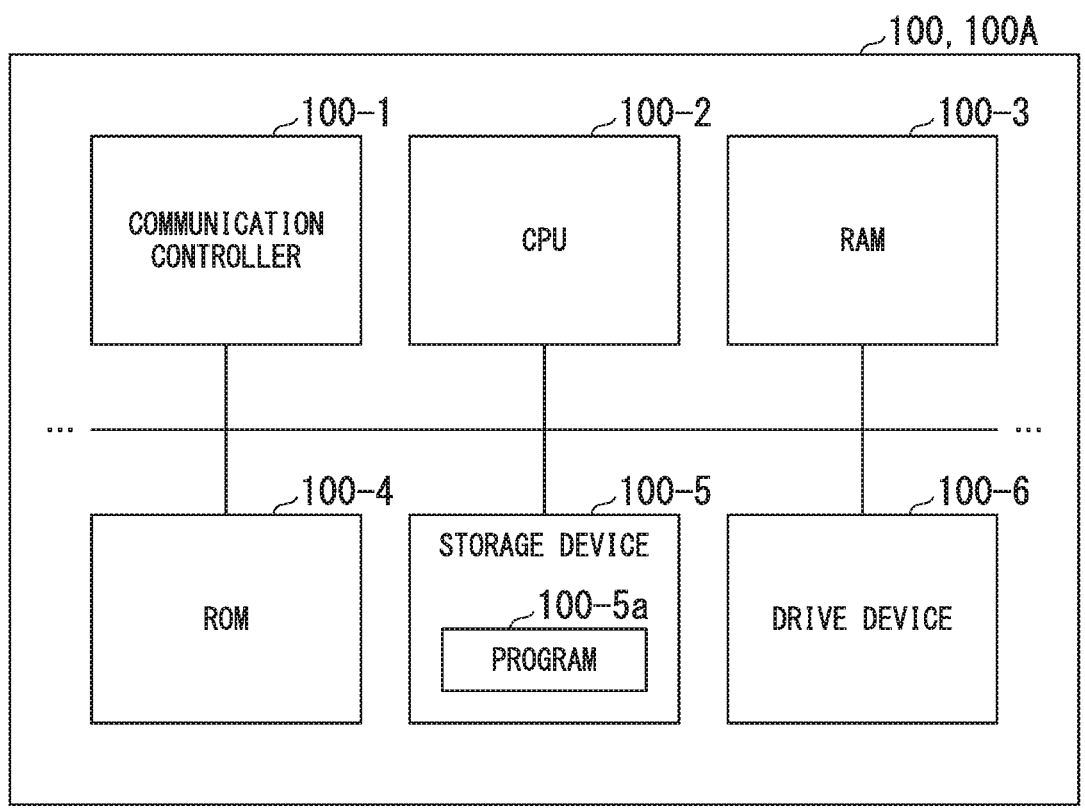
FIG. 12 is a diagram showing an example of a hardware configuration of a driving support control unit according to the embodiments.

The driving support control units 100 and 100A according to the above-mentioned embodiments are embodied, for example, by a hardware configuration illustrated in FIG. 12. FIG. 12 is a diagram showing an example of a hardware configuration of the driving support control units 100 and 100A according to the embodiments. The driving support control units 100 and 100A can employ a common hardware configuration, which will be collectively described below.

Each of the driving support control units 100 and 100A has a configuration in which a communication controller 100-1, a CPU 100-2, a random access memory (RAM) 100-3, a read only memory (ROM) 100-4, a storage device 100-5 such as a flash memory or a hard disk drive (HDD), and a drive device 100-6 are connected to each other via an internal bus or a dedicated communication line. A portable storage medium such as an optical disc is installed in the drive device 100-6. By causing a direct memory access (DMA) controller (not illustrated) or the like to load a program 100-5*a* stored in the storage device 100-5 or a program stored in the portable storage medium installed in the drive device 100-6 into the RAM 100-3 and causing the CPU 100-2 to execute the loaded program, the functions of the driving support control units 100 and 100A are embodied. The program referred to by the CPU 100-2 may be downloaded from another device, for example, via a network such as the Internet.

The above-mentioned embodiment can be expressed as follows.

A vehicle control system including a storage device that stores information and a hardware processor that executes a program, the program stored in the storage device causing the hardware processor to perform:

a lane change support control process of executing lane change of a vehicle independently of a steering operation by an occupant of the vehicle by receiving an operation from the occupant of the vehicle;

a road information acquiring process of acquiring a type of a road on which the vehicle is traveling;

a lane changeability determining process of determining whether lane change of the vehicle is to be executed in the lane change support control process; and a lane keeping support control process of controlling a steering device such that the vehicle is prevented from departing from a lane on which the vehicle is traveling independently of the steering operation by the occupant of the vehicle and continuing to perform a lane keeping operation in a case that it is determined in the lane changeability determining process that lane change of the vehicle is not to be executed on the basis of the type of the road.

While embodiments of the invention have been described above, the invention is not limited to the embodiments and can be subjected to various modifications and substitutions without departing from the gist of the invention.

What is claimed is:

1. A vehicle control system comprising:
 a lane change support control unit configured to execute lane change of a vehicle independently of a steering operation by an occupant of the vehicle by receiving an operation from the occupant of the vehicle;
 a road information acquiring unit configured to acquire at least a type of a road on which the vehicle is traveling;
 a lane changeability determining unit configured to determine whether lane change of the vehicle is to be executed by the lane change support control unit; and
 a lane keeping support control unit configured to control a steering device such that the vehicle is prevented from departing from a lane on which the vehicle is traveling independently of the steering operation by the occupant of the vehicle and to continue to perform a lane keeping operation in a case that the lane changeability determining unit determines that lane change of the vehicle is not to be executed on the basis of the type of the road, wherein the lane keeping support control unit determines whether a first condition and a second condition have been satisfied, in a case that the first condition and the second condition have been satisfied, perform a lane change of the lane change of the vehicle, wherein the lane keeping support control unit continues lane keeping in a state where a starting state is continued until a predetermined time has elapsed, in a case that the first condition has been satisfied and the second condition has not been satisfied, wherein the first condition includes a condition for changing the state of the vehicle to the starting state of the lane change assist control for the vehicle after the operation of the winker lever by the occupant is executed, wherein the second condition includes a condition for changing the state of the vehicle to an operating state in which the lane change assist control is activated.

2. A vehicle control system comprising:
a lane change support control unit configured to execute lane change of a vehicle independently of a steering operation by an occupant of the vehicle by receiving an operation from the occupant of the vehicle;
a lane changeability determining unit configured to determine whether lane change of the vehicle is to be executed by the lane change support control unit;
a driving operator configured to receive a steering operation of the vehicle from the occupant;
a grip determining unit configured to determine whether the occupant is gripping the driving operator; and
a lane keeping support control unit configured to control a steering device such that the vehicle is prevented from departing from a lane on which the vehicle is traveling independently of the steering operation by the occupant of the vehicle and to continue to perform a lane keeping operation in a case that the lane changeability determining unit determines that lane change of the vehicle is not to be executed and the grip determining unit determines that the occupant is not gripping the driving operator, wherein the lane keeping support control unit determines whether a first condition and the second condition have been satisfied, in a case that the first condition and the second condition have been satisfied, perform a lane change of the lane change of the vehicle, wherein the lane keeping support control unit continues lane keeping in a state where a starting state is continued until a predetermined time has elapsed, in a case that the first condition has been satisfied and the second condition has not been satisfied, wherein the first condition includes a condition for changing the state of the vehicle to the starting state of the lane change assist control for the vehicle after the operation of the winker lever by the occupant is executed, wherein the second condition includes a condition for changing the state of the vehicle to an operating state in which the lane change assist control is activated.

3. The vehicle control system according to claim 2, wherein the lane keeping support control unit ends the lane keeping operation thereof in a case that the grip determining unit determines that the occupant is gripping the driving operator.

4. The vehicle control system according to claim 1, wherein the lane change support control unit executes lane change using the lane change support control unit in a case that a state of the vehicle satisfies a first condition for switching lane change support control for the vehicle to a starting state and a second condition for switching the lane change support control to an operating state, and executes lane keeping using the lane keeping support control unit until a predetermined time elapses in a case that the state of the vehicle satisfies the first condition.

5. The vehicle control system according to claim 1, further comprising an information output unit configured to notify the occupant of one or both of a fact that lane change of the vehicle is not to be executed by the lane change support control unit and a fact that the lane keeping support control unit will continue to perform the lane keeping operation in a case that the lane changeability determining unit determines that lane change of the vehicle is not to be executed.

6. The vehicle control system according to claim 1, wherein the lane changeability determining unit determines that lane change of the vehicle is not to be executed in a case that the type of the road on which the vehicle is traveling is not an expressway.

7. The vehicle control system according to claim 1, further comprising a direction indicator that receives an instruction for lane change from the occupant, wherein the lane keeping support control unit continues to perform the lane keeping operation in a case that lane change is being instructed by the direction indicator.

8. A vehicle control method using an in-vehicle computer, comprising:
executing lane change of the vehicle independently of a steering operation by an occupant of the vehicle by receiving an operation from the occupant of the vehicle;
acquiring a type of a road on which the vehicle is traveling;
determining whether lane change of the vehicle is to be executed;
controlling a steering device such that the vehicle is prevented from departing from a lane on which the vehicle is traveling independently of the steering operation by the occupant of the vehicle and continuing to perform a lane keeping operation in a case that it is determined that lane change of the vehicle is not to be executed on the basis of the acquired type of the road;
determining whether a first condition and a second condition have been satisfied, in a case that the first condition and the second condition have been satisfied, perform lane change of the lane change of the vehicle; and
continuing lane keeping in a state where a starting state is continued until a predetermined time has elapsed, in a case that the first condition have been satisfied and the second condition have not been satisfied, wherein the first condition includes a condition for changing the state of the vehicle to the starting state of the lane change assist control for the vehicle after the operation of the winker lever by the occupant is executed, wherein the second condition includes a condition for changing the state of the vehicle to an operating state in which the lane change assist control is activated.

9. A non-transitory computer-readable storage medium recording a vehicle control program causing an in-vehicle computer to perform:

executing lane change of the vehicle independently of a steering operation by an occupant of the vehicle by receiving an operation from the occupant of the vehicle;

acquiring a type of a road on which the vehicle is traveling;

determining whether lane change of the vehicle is to be executed; and controlling a steering device such that the vehicle is prevented from departing from a lane on which the vehicle is traveling independently of the steering operation by the occupant of the vehicle and continuing to perform a lane keeping operation in a case that it is determined that lane change of the vehicle is not to be executed on the basis of the acquired type of the road;

determining whether a first condition and a second condition have been satisfied, in a case that the first condition and the second condition have been satisfied, perform lane change of the lane change of the vehicle; and continuing lane keeping in a state where a starting state is continued until a predetermined time has elapsed, in a case that the first condition have been satisfied and the second condition have not been satisfied, wherein the first condition includes a condition for changing the state of the vehicle to the starting state of the lane change assist control for the vehicle after the operation of the winker lever by the occupant is executed, wherein the second condition includes a condition for changing the state of the vehicle to an operating state in which the lane change assist control is activated.

\* \* \* \* \*